United States Patent [19]

Faroudja

[11] Patent Number: 4,912,557

[45] Date of Patent: Mar. 27, 1990

[54] CONTROL METHOD FOR TELEVISION GHOST REDUCTION SYSTEM

[76] Inventor: Yves C. Faroudja, 26595 Anacapa Dr., Los Altos, Calif. 94022

[21] Appl. No.: 194,200

[22] Filed: May 16, 1988

[51] Int. Cl.$^4$ .............................................. H04N 5/21
[52] U.S. Cl. ...................................... 358/167; 358/36; 358/905
[58] Field of Search ................... 358/167, 166, 36, 37, 358/905

[56] References Cited

U.S. PATENT DOCUMENTS

| | | | |
|---|---|---|---|
| 4,364,092 | 12/1982 | Holmes | 358/167 |
| 4,371,266 | 2/1983 | Holmes | 358/905 |
| 4,393,397 | 7/1983 | Holmes | 358/36 |

OTHER PUBLICATIONS

A Digitalized Automatic Ghost Canceller, Murakami, Ohzecki, Ogi, Toshiba Research and Development Center, Toshiba Corporation, Kawasaki, Japan, received Jul. 3, 1979, 1979 IEEE.
A Tutorial on Ghost Cancelling in Television Systems, Ciciora, Sgrignoli, Thomas, Zenith Radio Corporation, Glenview, Ill. 60025, received Jan. 12, 1979, 1979 IEEE.
Performance Evaluations of Selected Automatic Deghosting Systems for Television, Goyal, Armfield, Geller, Blank, GTE Laboratories Inc., 40 Sylvan Road, Waltham, Mass. 02154, IEEE Transactions on Consumer Electronics, vol. CE-26, Feb. 1980.
A Novel Automatic Ghost Canceller, Makino, Murakami, Sakurai, Ohnishi, Obara, Toshiba Research and Development Center, Kawasaki, Japan, 1980 IEEE.
Ghost Clean System, Murakami, Iga, Takehara, Toshiba Corporation, Kanagawa, Japan, 1983 IEEE, received 6/17/83.
Adaptive Multipath Equalization for T.V. Broadcasting, Thedick, Public Broadcasting Service, 475 L'Enfant Plaza, S.W., Washington D.C. 20026, received Mar. 22, 1977, IEE Transactions on Consumer Electronics, 5/1977.
Ghost Reduction System for Television Receivers, Yamamoto, Yamaguchi, Miyata, Television Engineering Center, Matsushita Electric Ind. Co., Ltd., Matsushita-cho, Ibaraki, Osaka, Japan, received Jul. 29, 1977, IEEE vol. CE-23, No. 3, 8-77.

(List continued on next page.)

Primary Examiner—Tommy P. Chin
Attorney, Agent, or Firm—David B. Harrison

[57] ABSTRACT

A method for controlling reduction of a ghost image present in a main path baseband television video signal includes the steps of deriving a main path reference pulse and ghost image of the pulse from a successive series of pulses and ghost images of the pulses present during the vertical blanking interval of a present field of the video signal, the derived ghost image having an amplitude less than the amplitude of the derived main path reference pulse; replicating the derived reference pulse and ghost image at a predetermined repetition rate substantially throughout the useful picture area of the present field interval; generating a signal used for correlation which is delayed in time from the occurrence of the beginning of the present video field; correlating the replicated ghost image with the signal used for correlation to ascertain a location of coincidence in order to provide a correction pulse indicating the delay period and amplitude of the ghost image of the pulse; generating at least two control signals respectively related to the correction pulse: establishing a ghost reduction network structure for the present field in response to the two said control signals and maintaining the established structure throughout the present field and until the ghost reduction network structure is reestablished by the foregoing steps during subsequently occurring fields; and, passing the main path baseband television video signal through the network during the present field and combining a function related to determined amplitude and delay period of the ghost image with the baseband television video signal in order to reduce the amplitude of the ghost image present in the video signal.

20 Claims, 18 Drawing Sheets

OTHER PUBLICATIONS

A Fully Automatic Ghost Canceller, Makino, Sakurai, Iwasawa, Ohnishi, Murakan, Miura, Toshiba R & D Center, Toshiba Corp., Kawasaki, Japan, received Jun. 24, 1978, IEEE Transactions on Consumer Electronics, vol. CE-2, No. 3, Aug. 1978.

Advanced Digital Television System, Yip, Kongable, Motorola, Inc., Semiconductor Products Sector, MD 56-122, Phoenix, Ariz. 85018, received Aug. 5, 1986, IEEE Transactions on Consumer Electronics, vol. CE-32, No. 4, Nov. 1986.

Practical TV Ghost Canceller Using Two-Stage CCD Transversal Filter, Murata, Kazumi, Kondo, Abe, Horino, Hitachi Consumer Products Research Center, Yokohama, Japan, Hitachi Mussashi Works, Tokyo, Japan, ICCE 83/6/9/83.

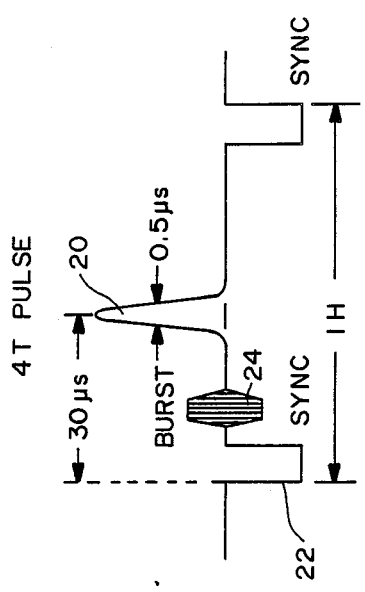
FIG.—IA
H DISPLAY
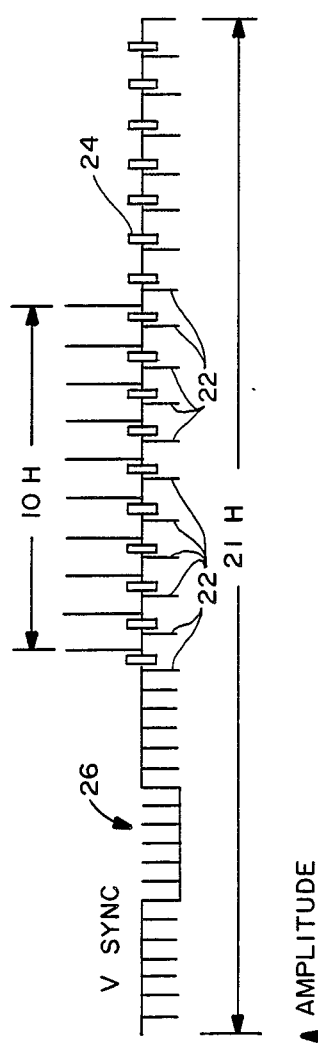
FIG.—IB
V. DISPLAY
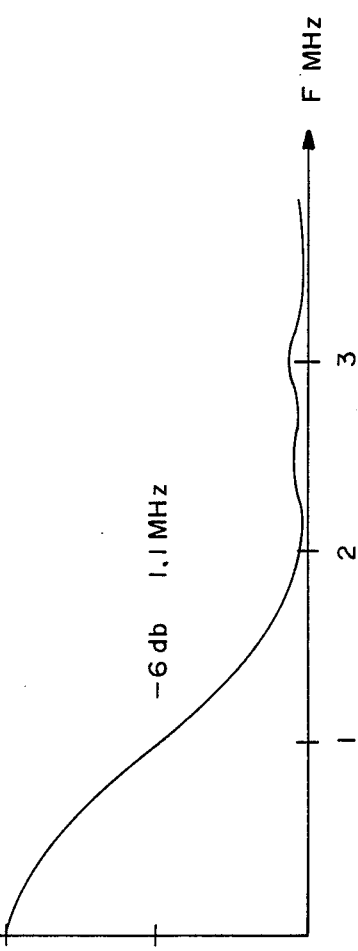
FIG.—IC
F DISPLAY

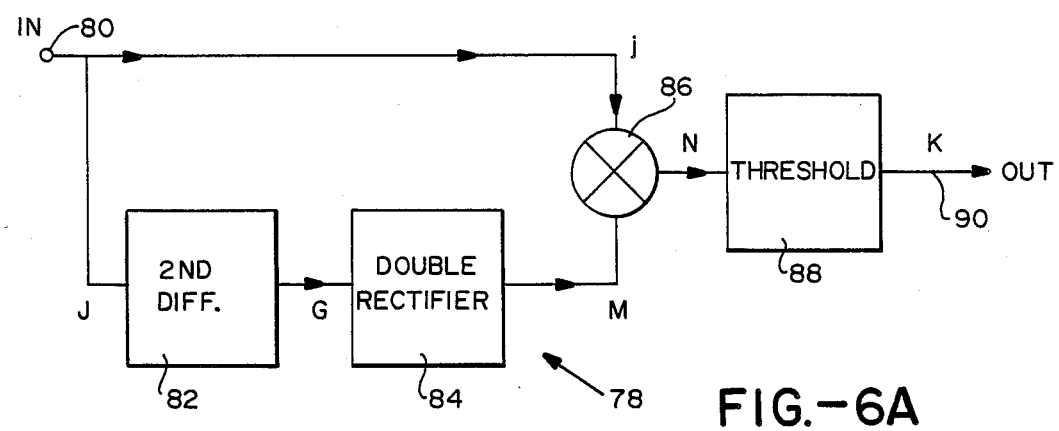
FIG.—6A
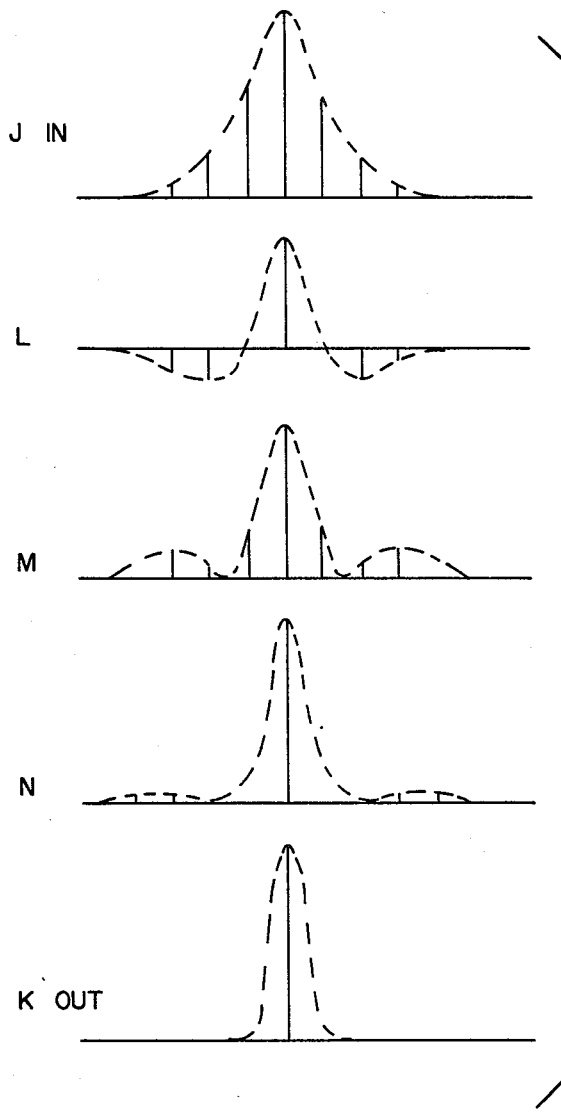
FIG.—6B

FIG.-7A
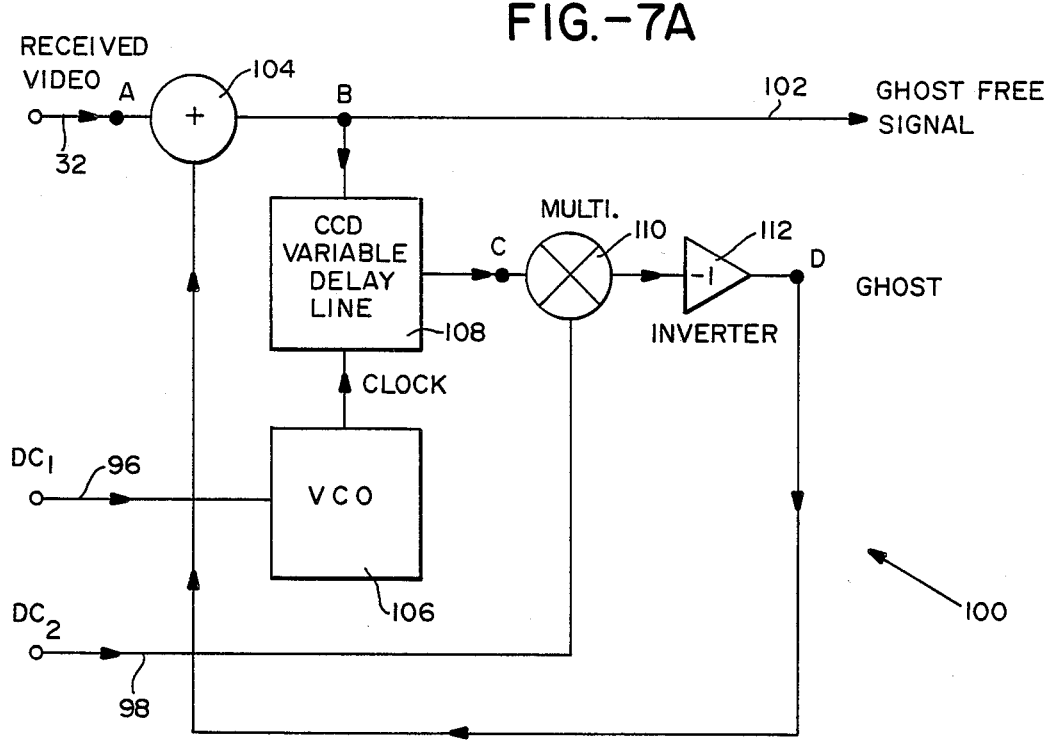
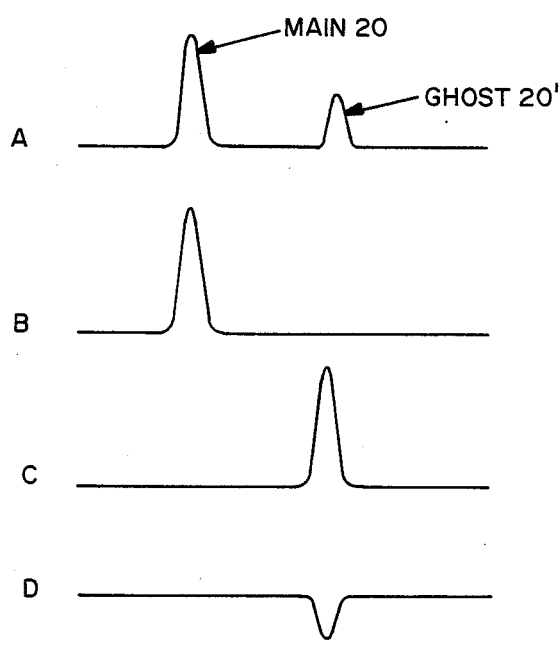
FIG.-7B

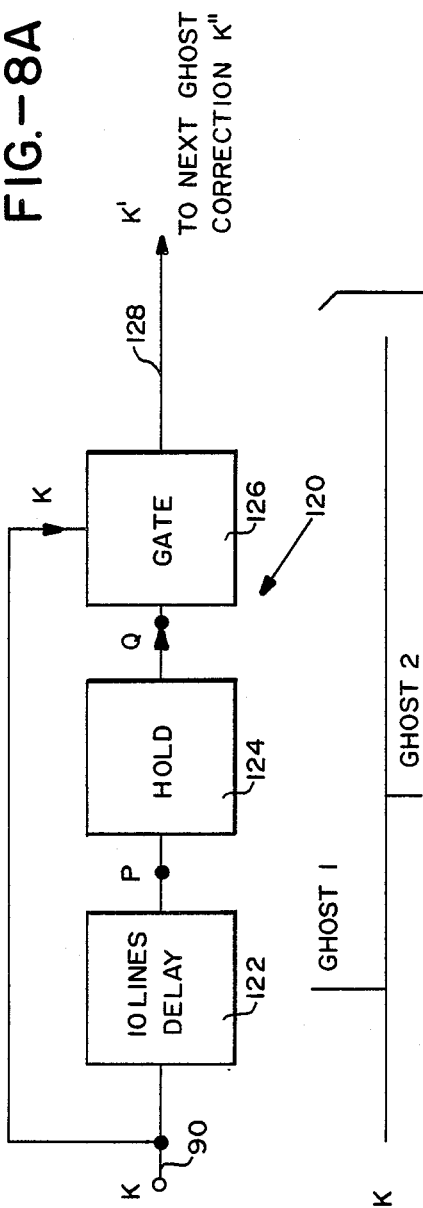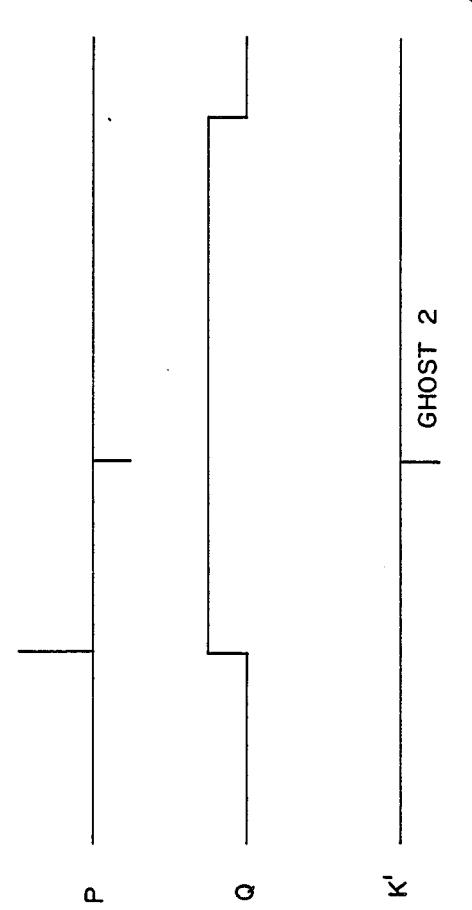

CONTROL METHOD FOR TELEVISION GHOST REDUCTION SYSTEM

FIELD OF THE INVENTION

The present invention relates to television signal transmission systems and methods. More particularly, the present invention relates to methods for controlling television ghost reduction systems for reducing unwanted ghost images from television signals at the point of reception by deriving ghost image reduction information from information originally replicated in the signal at the transmission end.

BACKGROUND OF THE INVENTION

Television reception is very often handicapped by multi-path signal propagation conditions which cause groups of the same signal to arrive at the reception point at different times, leading to the presentation of ghost images in the reproduced picture. Double or multiple images are often the result of these undesirable propagation conditions. These ghost images or echoes are typically faint but often objectionable replica of the original or main path signal. Other propagation defects are also often present. These include response (frequency) degradation, short term (less than one microsecond) reflections, group delay errors, random noise and non-random interferences.

The prior approaches to the problem of reducing ghost images have not been very successful, since those prior approaches proceeded on a theory of completely eliminating the unwanted ghost images. Complete elimination of ghost images remains a most difficult technical achievement. Systems and methods for partial ghost image reduction are known in the prior art. These systems have usually relied upon a single sample of the ghost image in order to set the time delay and gain factor for recursive filters.

Examples of prior approaches include: Thedick, "Adaptive Multipath Equalization for T.V. Broadcasting", IEEE Trans. on Consumer Electronics, May 1977, pp. 175-181; Yamamoto, Yamaguchi, and Miyata, "Ghost Reduction System for Television Receivers", IEEE Trans. on Consumer Electronics, Vol CE-23, No. 3, August 1977, pp. 327-333; Makino, Sakurai, Iwasawa, Ohnishi, Murakami and Miura, "A Fully Automatic Ghost Canceller", IEEE Trans. on Consumer Electronics, Vol. CE-24, No. 3, August 1978, pp. 267-271; Murakami, Ohzeki and Ogi, "A Digitalized Automatic Ghost Canceller", IEEE Trans. on Consumer Electronics, Vol. CE-25, August 1979, pp. 555-561; Ciciora, Sgrignoli, and Thomas, "A Tutorial on Ghost Cancelling in Television Systems", IEEE Transactions on Consumer Electronics, Vol. CE-25, February 1979, pp. 9-44; Goyal, Armfield, Geller and Blank, "Performance Evaluations of Selected Automatic Deghosting Systems for Television", IEEE Transactions on Consumer Electronics, Vol. CE-26, February 1980, pp. 100-120; Makino, Murakami, Sakurai, Ohnishi and Obara, "A Novel Automatic Ghost Canceller", IEEE Trans. on Consumer Electronics, Vol CE-26, August 1980, pp. 629-637; Murakami, Iga and Takehara, "Ghost Clean System", IEEE Trans. on Consumer Electronics, Vol. CE-29, August 1983, pp. 129-133; Yip and Kongable, "Advanced Digital Television System", IEEE Trans. on Consumer Electronics, Vol. CE-32, No. 4, November 1986, pp. 743-753; and, Murata, Kazumi, and Kondo, "Practical TV Ghost Canceller Using Two-Stage CCD Transvessal Filter", 1983 IEEE Intern. Conference on Consumer Electronics, Digest of Technical Papers, pp 136-137.

Therefore, a hitherto unsolved need has existed for a practical ghost image reduction control system which is technically feasible at relatively low cost.

SUMMARY OF THE INVENTION WITH OBJECTS

The present inventor has discovered that an approximative, imperfect ghost image reduction control mechanism may easily and practically be implemented at low cost. Complete, "fine tuned" elimination of ghost images as well as correction of other propagation defects may be provided by other processing methods.

A very good approximative ghost reduction control system may be achieved very simply if the following propositions are accepted concerning ghost images:

(1) A ghost image is at least 6db lower than the main path signal.

(2) The ghost image is a duplicate of the main path signal and may be assumed to be a linear replica of the main path signal without distortion.

(3) The ghost image frequency response is the same as the main path signal frequency response.

(4) Knowledge of the ghost delay and amplitude at only low video frequencies is sufficient to provide effective ghost image reduction in the entire video band.

(5) Ghost image amplitude and delays are unknown, but constant over a few seconds interval, except when the viewer changes channels, for example.

(6) The ghost image delay range in which correction is feasible varies between 0.5 microseconds and 30 microseconds Thus, a general object of the present invention is to provide an improved control method for controlling operation of a television signal ghost image reduction system which follows the foregoing assumptions and which is realized with far less circuit complexity than hitherto achieved.

In accordance with the principles of the present invention, a method for controlling reduction of a ghost image present in a main path baseband television video signal includes the steps of:

deriving a main path reference pulse and ghost image of the pulse from a successive series of pulses and ghost images of the pulses present during the vertical blanking interval of a present field of the video signal, the derived ghost image having an amplitude less than the amplitude of the derived main path reference pulse, replicating the derived reference pulse and ghost image at a predetermined repetition rate substantially throughout the useful picture area of the present field interval, generating a signal used for correlation which is delayed in time from the occurrence of the beginning of the present video field, correlating the replicated ghost image with the signal used for correlation to ascertain a location of coincidence in order to provide a correction pulse indicating the delay period and amplitude of the ghost image of the pulse, generating at least two control signals respectively related to the correction pulse, establishing a ghost reduction network structure for the present field in response to the two said control signals and maintaining the established structure throughout the present field and until the ghost reduction network structure is reestablished by the foregoing steps during subsequently occurring fields, and passing the main path baseband television video signal through the network during the present field and combining a function related to determined amplitude and delay period of the ghost image with the baseband television video signal in order to reduce the amplitude of the ghost image present in the video signal.

In one aspect of the present invention the steps of establishing a ghost reduction network structure for the present field in response to the two said control signals and passing the main path baseband television video signal through the network during the present field are implemented by the steps of:

summing the baseband television picture signal and a function of the baseband picture signal in order to reduce the ghost image by cancellation, delaying a component of the summed baseband television signal by a delay period related to one control signal corresponding to the delay of the ghost image, multiplying the delayed component of the baseband television signal by an amplitude value of the other control signal corresponding to the amplitude of the ghost image, inverting the delayed product to provide the function added to the baseband video signal at the summing step, above.

These and other objects, aspects, advantages and features of the present invention will be more fully understood and appreciated by those skilled in the art upon consideration of the following detailed description of the presently preferred embodiments, presented in conjunction with the accompanying drawings.

BRIEF DESCRIPTION OF THE DRAWINGS

In the Drawings:

FIG. 1 graphs a reference pulse to be transmitted during a vertical synchronization interval of the television video signal in accordance with the principles of the present invention.

FIG. 6A is a block diagram of a detector of maximum amplitude element of the FIG. 4 ghost image eliminator system.

FIG. 6B sets forth a series of waveform graphs illustrating operation of the FIG. 6A maximum amplitude detector.

FIG. 7A is a block diagram of a ghost eliminator circuit element of the FIG. 4 ghost image eliminator system.

FIG. 7B sets forth a series of waveform graphs illustrating operation of the FIG. 7A ghost eliminator circuit element.

FIG. 8A is a block diagram of a next ghost image correction circuit element of the FIG. 4 ghost image eliminator system.

FIG. 8B sets forth a series of waveform graphs illustrating operation of the FIG. 8A next ghost image correction circuit.

DETAILED DESCRIPTION OF PREFERRED EMBODIMENTS

Figure 2:
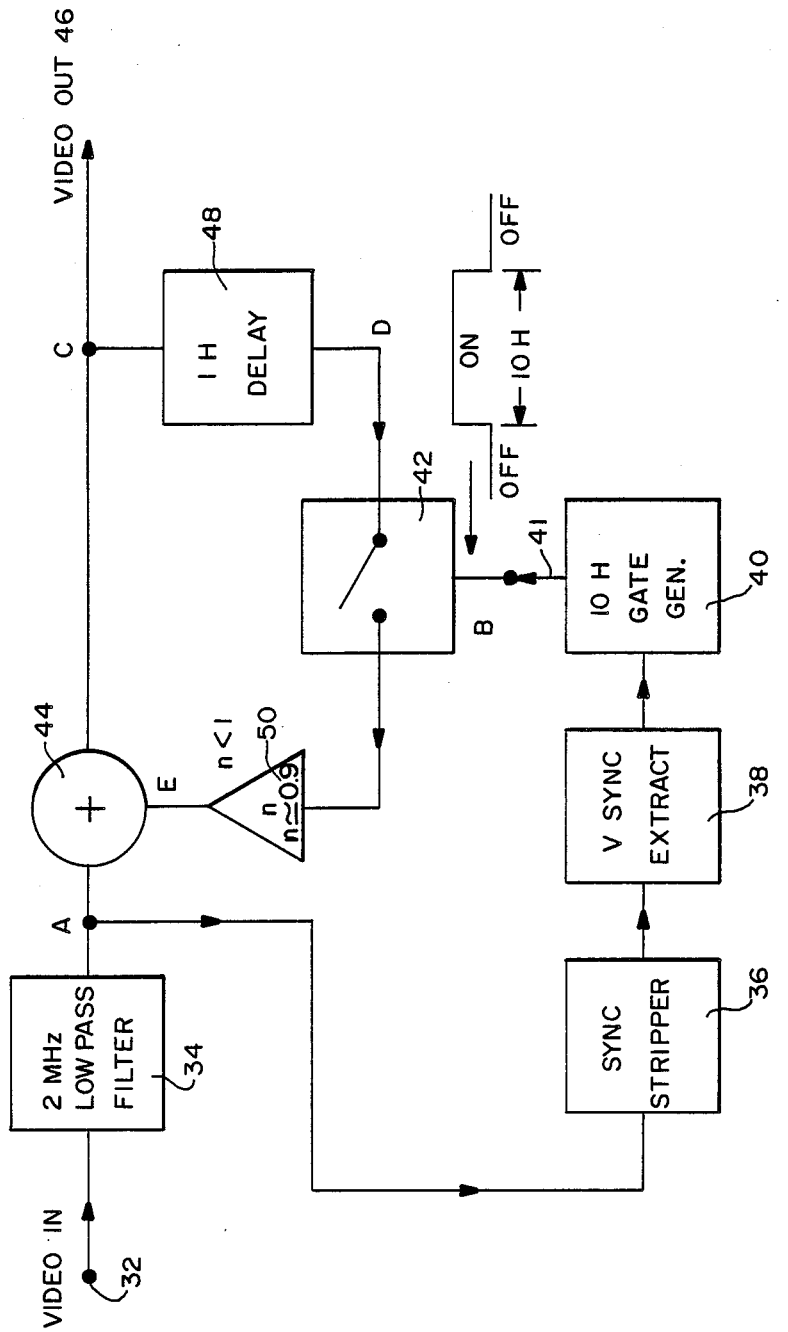
FIG. 2 is a block diagram of a ten line averager at the receiving end of the trassmission system for averaging the FIG. 1 reference pulse over e.g. ten lines in order to improve its signal to noise ratio.

The FIG. 1A horizontal time domain diagram graphs one reference pulse 20 which is generated at a transmitting end of a quadrature modulated color subcarrier television system and inserted into e.g. 10 lines of the picture within the vertical blanking interval, as graphed in vertical time domain graph of FIG. 1B. Spectral amplitude of the pulse is graphed in the amplitude versus frequency graph of FIG. 1C. The horizontal sync pulse 22, color burst 24 and vertical sync pulse 26 are also illustrated in FIGS. 1A and 1B.

The pulse 20 is preferably located approximately 20 to 30 microseconds following the leading edge of the horizontal (line rate) sync pulse in order to be protected from ghosts of the H sync pulse while leaving enough room before the next sync pulse to detect its own ghosts. The pulse 20 is preferably a 4T sine-squared pulse. Its half amplitude duration is 0.5 microseconds.

The advantage of using a broad pulse is that its spectrum is of low energy at its high frequency end. A low frequency spectrum, as illustrated in the FIG. 1C graph, provides for good low pass filtering at the receiver end of the television system and leads to better signal to noise ratios without distortion or ringing.

The reference pulses 20 are repeated ten times every field during the vertical interval as at lines 10 through 19 and at lines 272 through 281.

Figure 3:
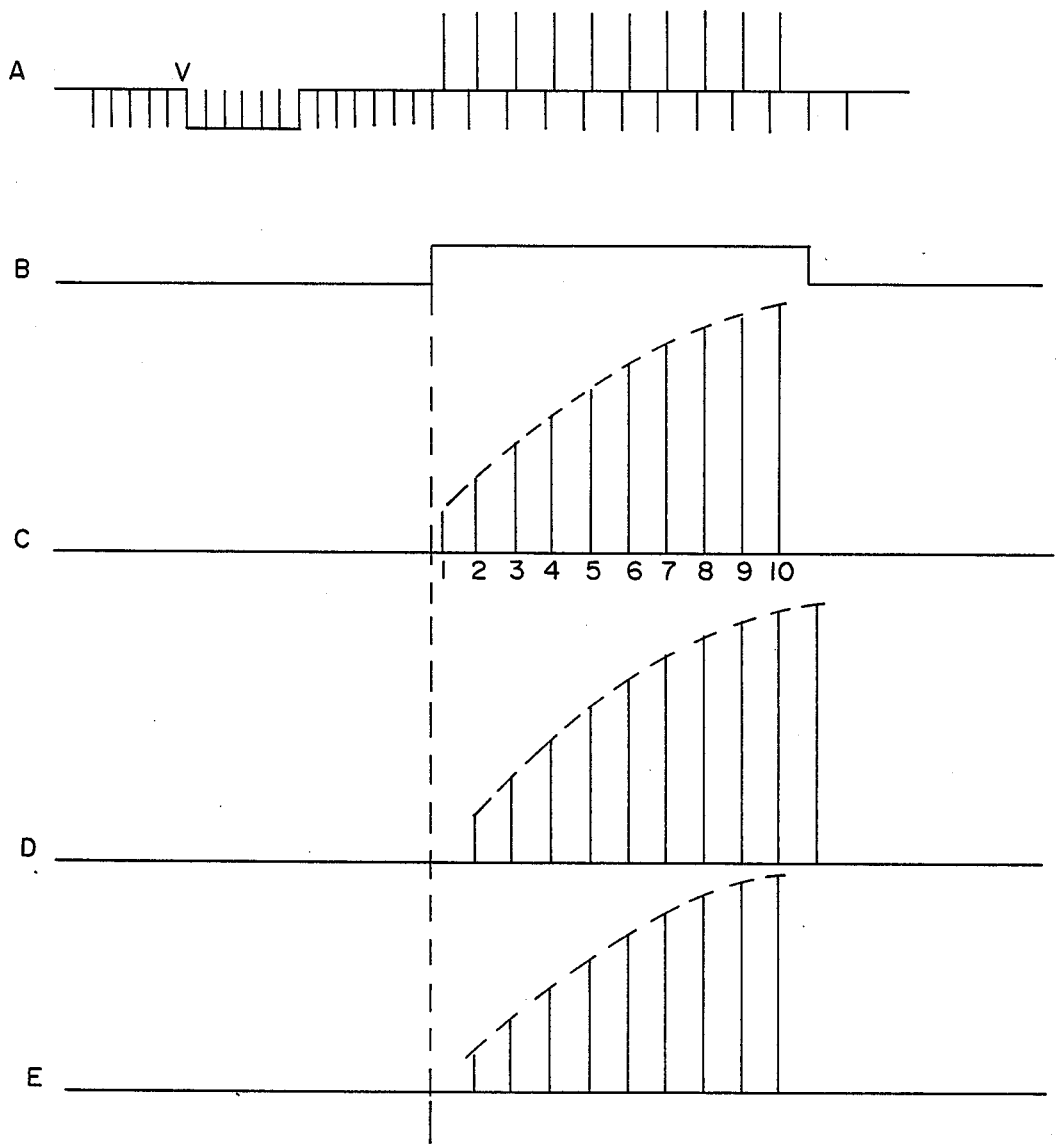
FIG. 3 sets forth a series of waveform graphs illustrating the operation of the FIG. 2 averager.

With reference to FIGS. 2 and 3, a method for improving the reference pulse signal to noise ratio is carried out by averaging the reference signals over ten lines. A reference pulse averaging circuit 30 includes a video input 32 for receiving the video signal at the reception end of the television transmission system. Typically, the circuit 30 is included in the television picture receiving apparatus.

The video input 32 is connected to a 2 MHz cutoff low pass filter 34 which low pass filters the incoming signal in order to improve the signal to noise ratio, and results in a signal graphed as waveform A in FIG. 3. The low pass filter circuit 34 does not modify the response of the reference pulse 20.

A sync stripper circuit 36 removes the sync from the low pass filtered video signal, and a vertical extractor 38 passes only the vertical interval portion of the video signal. A ten line gate generator circuit 40 generates a switch control signal graphed as waveform B in FIG. 3 at a time to pass the ten lines of the vertical blanking interval containing the FIG. 1 reference pulses 20 and to reject or blank all other lines of the present field. The switch control signal is put out on a line 41 to control a gate circuit 42 within a recirculation path.

Averaging is performed by recirculating at the line rate (1H) the reference signal 20. The reference signal recirculation takes place only during the ten line period containing the reference pulses 20, as established by the switch control signal, graph B of FIG. 3.

The recirculation path includes a summing junction 44 leading to an output 46. The signal put out at the output 46 is graphed as waveform C in FIG. 3. A one line delay circuit 48 is connected to the output 46, and its output, graphed as waveform D in FIG. 3, is connected to one of the switch contacts of the "soft" or electronic switch 42, the other contact thereof being connected to a less than unity gain amplifier 50 having a gain factor n. The delayed, amplitude limited signal put out by the amplifier 50, graphed as waveform E in FIG. 3, is combined with the incoming low pass filtered signal coming from the low pass filter 34 in the summing junction 44.

The last pulse put out from the circuit 30 as graphed in FIG. 3C represents the ten line average of the ten reference signals. The coefficient of recirculation n is selected to be as close as possible to unity, in order to give equal weight to each of the pulses, but is set to be slightly less than unity in order to avoid positive feedback and resultant oscillation and instability in the recirculation circuit 30. A factor of 0.9 for n is a good compromise in this regard. The signal to noise improvement of the reference pulse 20 and its ghost image achieved by low pass filtering and recirculation is approximately 12 db. Thus, the averaging process described in FIGS. 2 and 3 provides reference pulses and their ghost images which are very robust and much more reliable for control of ghost image reduction systems than heretofore.

Figure 4A:
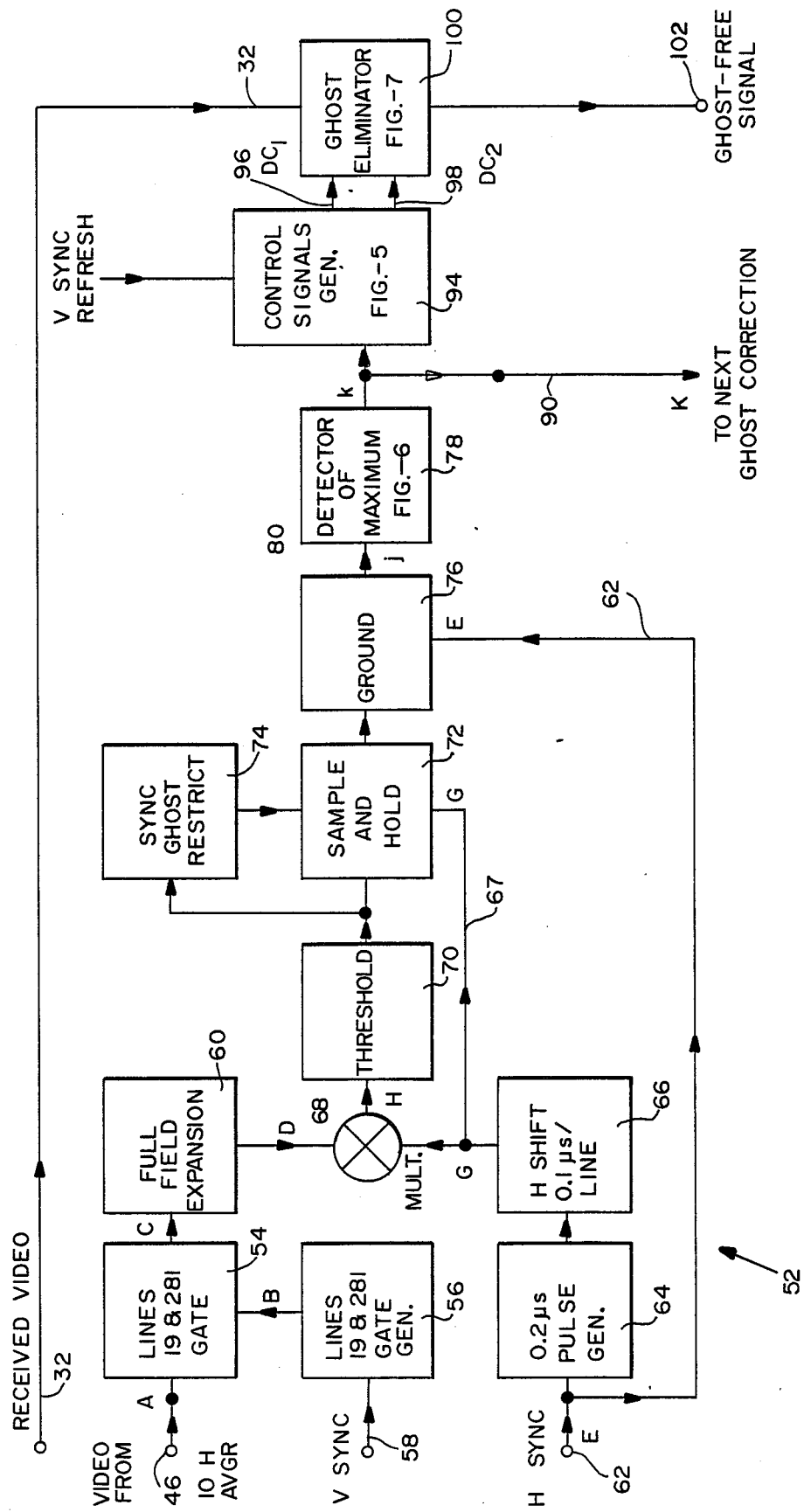
FIG. 4A is a block diagram of a ghost image eliminator system provided at the receiving end and incorporating the principles of the present invention.

With reference to FIGS. 4-7, a ghost image correction control system 52 is depicted in the FIG. 4A block diagram. It receives the low pass filtered and averaged reference pulses 20 (and ghost images thereof) via the line 46. The last or average pulse (and ghost image) of each group of ten (line 19 and line 281) is selected by a last line selector gate circuit 54 operating under the control of a lines 19 and 281 gate control signal generator circuit 56. Vertical sync enters the generator circuit 56, and the control signal, waveform B in FIG. 4B is thereupon generated and applied to control the gate 54. Waveform C of FIG. 4B illustrates the last one of the group of ten reference pulses 20 passing through the gate circuit 54 to a full field expansion circuit 60.

The full field expansion circuit 60 replicates the selected averaged and now very robust reference pulse (and its ghost image) on a line-to-line basis in order to extend throughout substantially the entirety of the useful information part of the present video field, avoiding however the vertical interval. This duplication, put out on a line 61, is illustrated as waveform D of FIG. 4B. The techniques for implementing the full field expansion circuit 60 are well known by those skilled in the art, as illustrated for example by Videotext techniques.

Figure 4B:
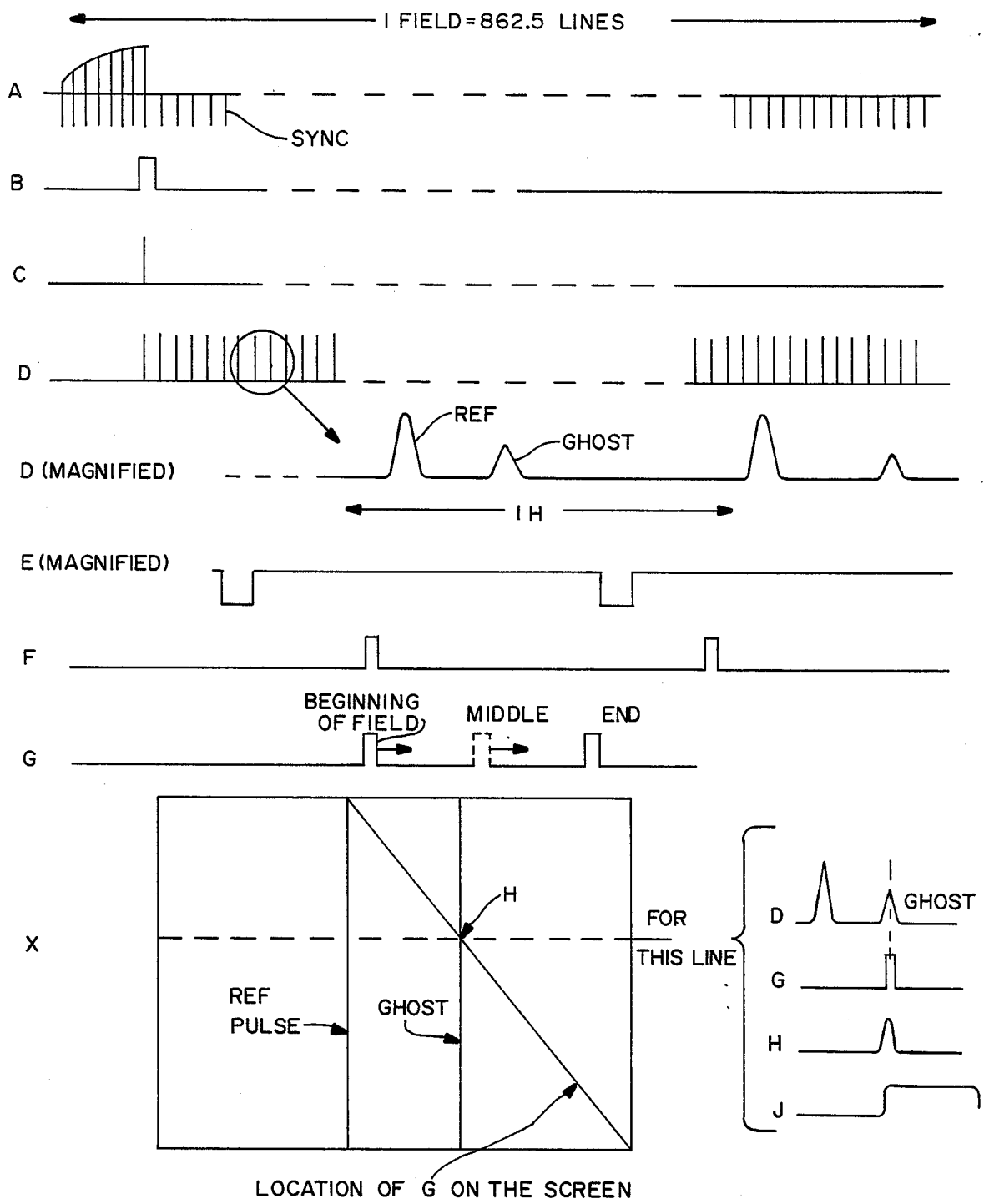
FIGS. 4B and 4C respectively set forth series of waveform graphs illustrating the operation of the FIG. 4A ghost image eliminator system.

The signal put out from the full field expansion circuit 60 on the line 61, waveform D of FIG. 4B, as repeated identically from line to line over the useful portion of the whole field, will include the averaged reference test pulse signal, as well as the averaged ghost images of the reference test pulse signal.

Horizontal sync, graphed as waveform E of FIG. 4B, is received at an input 62 leading to a 0.2 microsecond pulse generator 64. The generator 64 generates a 0.2 microsecond pulse at a time t which is equal to 31 microseconds after the beginning of the field. The pulse, waveform F in FIG. 4B, is shifted by 0.1 microseconds on a line-to-line basis by operation of a shift circuit 66. In these conditions, the waveform F pulse will progressively sweep across the entire active video field. Its appearance on the screen is represented as waveform G in FIG. 4B and progressively moves to the right in each successive line by 0.1 microseconds in the field, as graphed by the diagonal line in graph X of FIG. 4B. Thus, for each scan line within the present video field, the location in time of the waveform G pulse is moved to the right, for example.

Waveform G is applied via a line 67 as one input to a multiplier circuit 68, the other input thereof being the full field expansion of the reference signal, waveform D of FIG. 4B. The multiplier circuit 68 in fact acts as a correlator and delivers a ghost image identifier signal output pulse, graphed as waveform H of FIG. 4B only when a ghost pulse is present in waveform D and the progressively delayed reference pulse, waveform G occur simultaneously as inputs to the multiplier 68.

Thus, the location of the ghost image identifier output pulse, waveform H of FIG. 4B, in time will indicate the ghost image delay period from the beginning of the field; and the amplitude of the waveform H signal will indicate ghost image amplitude. The signal provided as waveform H therefore includes all of the parameters needed to identify the first ghost image following the main path image. Subsequent ghosts are not treated by the FIG. 4A apparatus. However, other techniques, described hereinafter, are available to reduce multiple ghosts.

The ghost image identifier output signal put out by the multiplier 68 is subjected to a predetermined minimum amplitude threshold process carried out within a circuit 70 in order to avoid false readings due e.g. to noise, long term ghosts of the sync pulse, and/or reference pulse ringing. The ghost image identifier signal, waveform H is then sampled and held by a sample and hold circuit 72. The sample and hold circuit 72 is triggered by the line-progressive reference pulse, waveform G from the shift circuit 66 and inhibited by a sync ghost restrict signal generated by a sync ghost restrict circuit 74 until the end of the current scan line.

The function of the sync ghost restrict circuit 74 is to enable the control system 52 to ignore potential sync ghosts which might be superimposed in time with actual reference pulses 20 and therefore lead to erroneous measurements of ghost images. Recognition of sync ghost images is based on the fact that the width thereof is predictable, i.e. 4.7 microseconds. Detection and elimination of signals of a known width or duration may be carried out with techniques which are very well documented within the prior art.

Figure 4C:
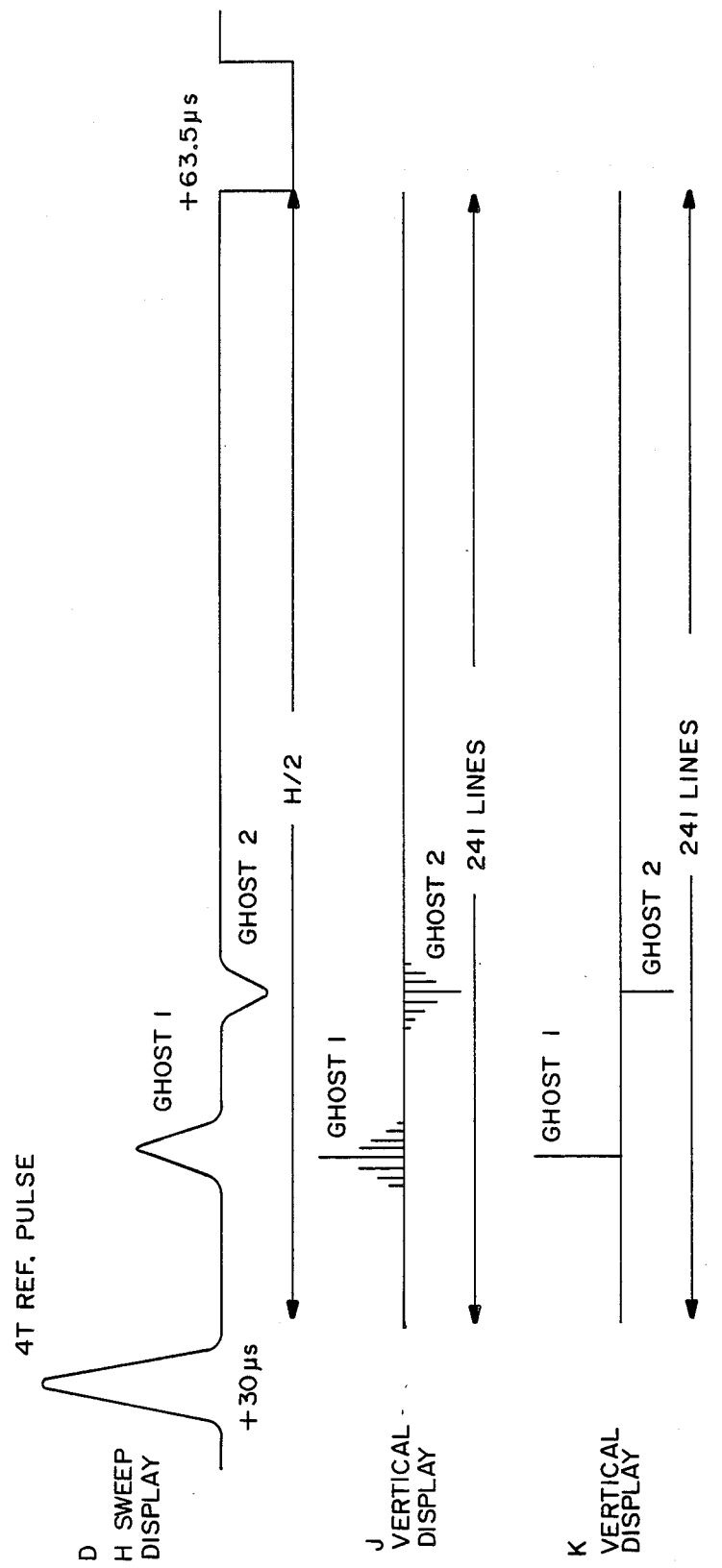

Then, all of the signals are grounded by operation of a grounding circuit 76 which responds to the horizontal sync pulse timing, waveform E of FIG. 4B. As shown in FIG. 4C, the signal J represents a time expanded image in the vertical domain of the ghost structure received by the television receiver and manifested as waveform D leading from the full field expansion circuit 60 in FIG. 4A.

The time expanded image signal, waveform J of FIG. 4C, enters a maximum amplitude detector circuit 78. This circuit 78 is a structure known to those skilled in the art, and it is illustrated in greater structural detail in FIG. 6A. Therein, an input 80 leading from the ground circuit 76 passes through a second differential circuit 82 which derives the second differential of the waveform J, depicted in the vertical domain in FIG. 6B for convenience.

This process provides a signal L, as graphed in FIG. 6B. The sign of waveform L is removed by a double rectifier circuit 84 which puts out a signal graphed as waveform M in FIG. 6b. The signals J and M are then combined in a multipler 86 to yield waveform N. Then, waveform N is passed through a minimum amplitude threshold circuit 88 to eliminate any components of the waveform other than the major pulse, graphed as waveform K in FIG. 6B.

Thus, it will be appreciated that the circuit 78 generates a second differential of the waveform J signal in order to detect and isolate a maximum value of such signal, the maximum value being put out from the circuit 78 as the waveform K of FIGS. 4B and 4C. It is immaterial to the operation of the circuit 78 as to whether the incoming signal, waveform J, is analog or digital, sampled or not. Delays which are necessarily occurring in the operation of the circuit 78 are omitted in order to provide clarity to the present disclosure.

Waveform K of FIG. 4C comprises a succession of pulses, each pulse having an amplitude, sign and temporal position (delay) proportional to amplitude and delay of its corresponding ghost image. This signal is then used to generate two control signals DC1 and DC2 which are required to control respectively the time delay and amplitude for e.g. additive ghost image reduction in accordance with the principles of the present invention.

Figure 5A:
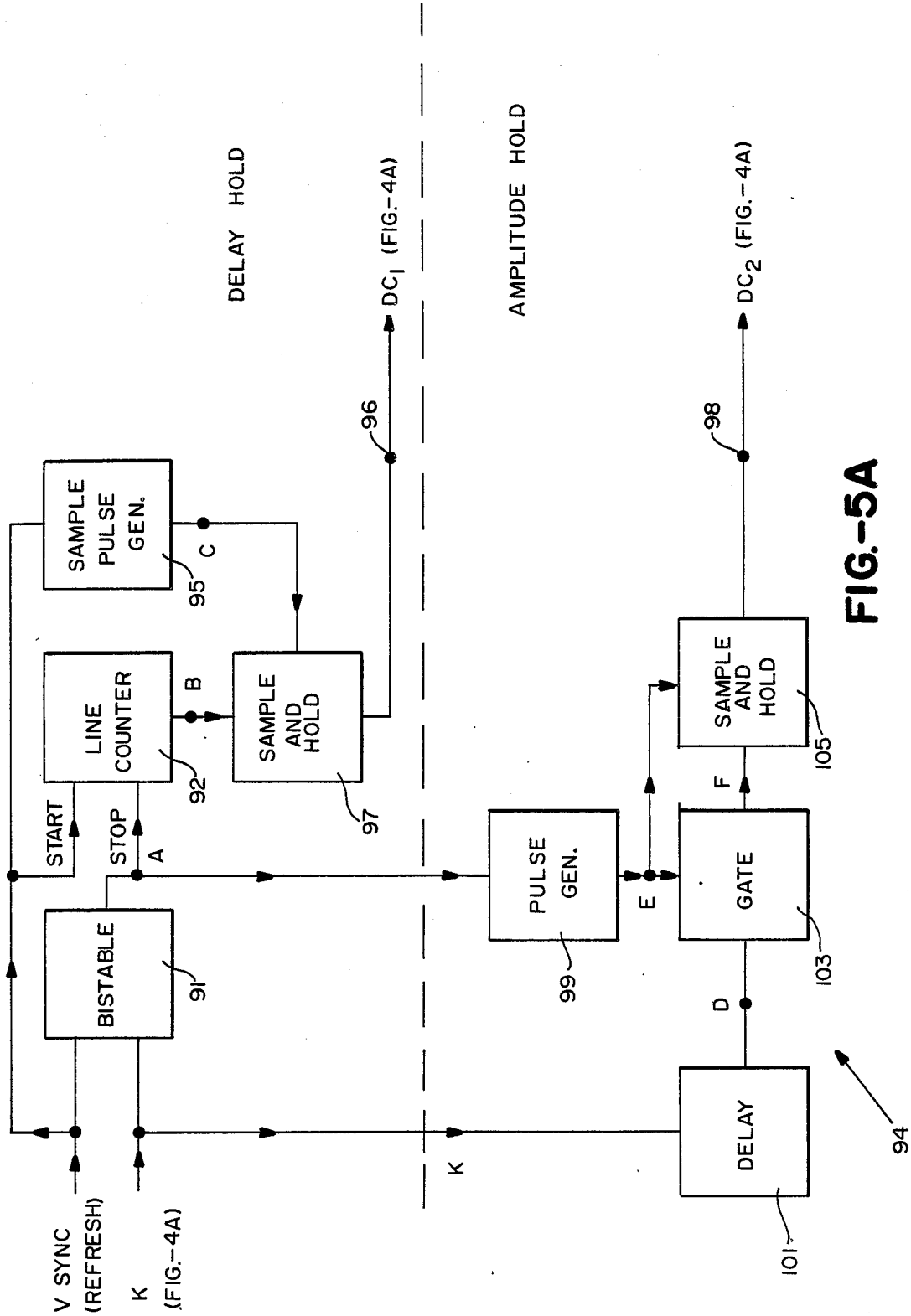
FIG. 5A is a block diagram of a generator of control signals element of the FIG. 4A ghost eliminator system.
Figure 5B:
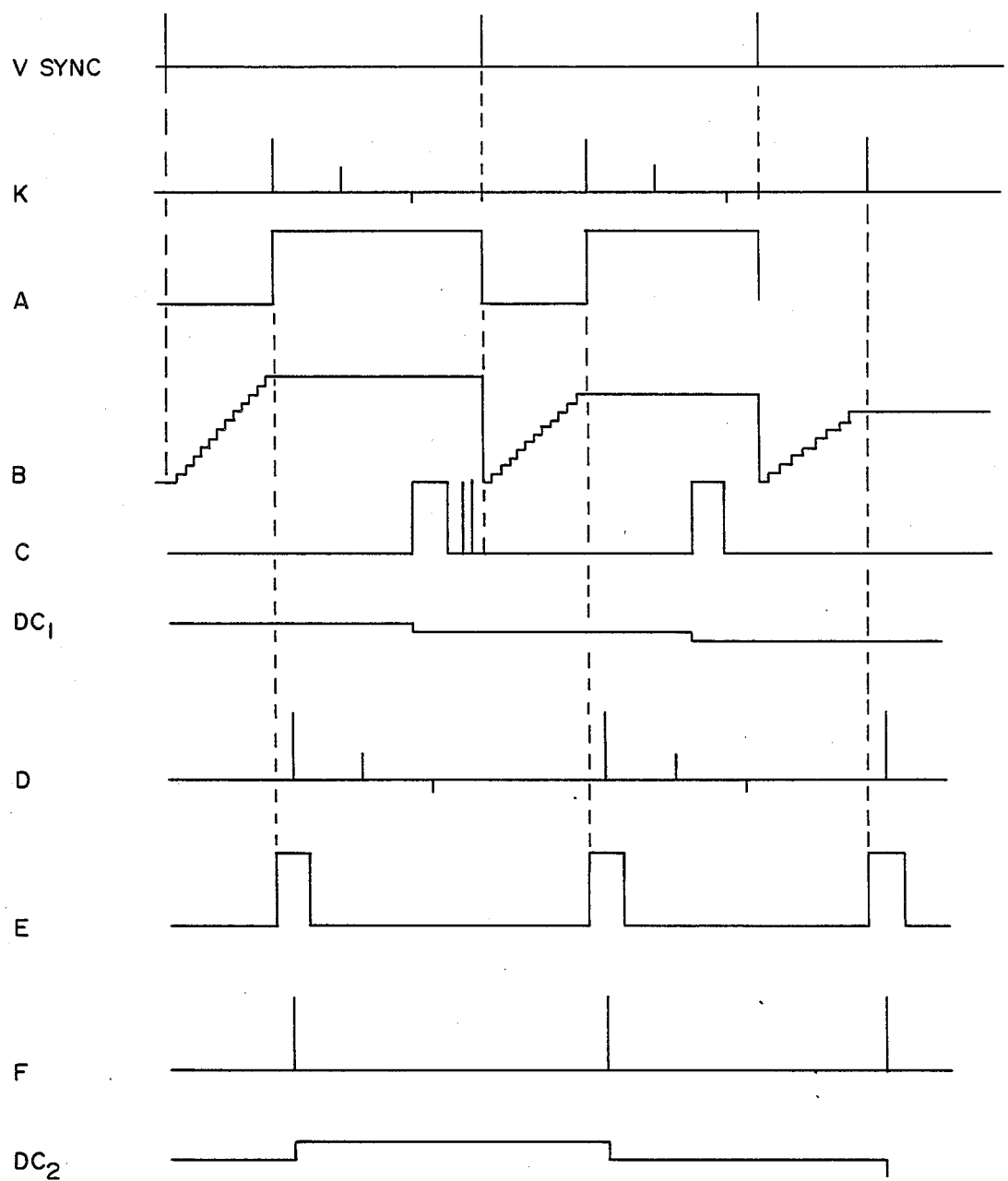
FIG. 5B sets forth a series of waveform graphs illustrating operation of the FIG. 5A generator of control signals element.

The mechanism for generating the DC1 and DC2 signals is depicted in FIG. 5B and is as follows:

DC1: A bistable 91 is set to zero by the vertical sync pulse (reset) and is set to a logical one by the first ghost detected as pulse K. A line counter 92 is connected to the output of the bistable 91 and is therefore started at the beginning of the field and stopped when pulse K appears at the output of the circuit 78. Each count reached by the counter 92 represents an increasing amplitude increment or voltage step, as shown in the waveform graph DC1 of FIG. 5B. The counter 92 thus functions as a digital implementation of a voltage ramp generator. The final increment or step amplitude reached by the counter 92 before being stopped by the K pulse represents the DC1 time delay control signal, and it is latched and held in a sample and hold 97 until the counter is restarted and stopped as the the next sample is taken and measurement performed during the next field interval. The Vertical refresh signal is used to reset the counter 92 to zero at the beginning of the succeeding field in order to enable a new detection process to be carried out for each succeeding field, but the DC1 signal derived from the prior field is held by the sample and hold circuit 97 (which is controlled by pulse C of FIG. 5B, generated by sample pulse generator 95) until another pulse K appears at the output of the circuit 78 and a new DC1 signal is provided.

DC2: Similarly, the amplitude of pulse K, being representative of the amplitude of the ghost image relative to the main path image, is delayed by a delay 101 in order to be centered by reference to gate signal E (FIG. 5B) generated by a pulse generator 99 (FIG. 5A). Pulse K is then gated by a gate 103 to provide a signal F (FIG. 5B) which is sent to a sample and hold circuit 105, where its amplitude information is held until another pulse K is put out from the circuit 78 during the next field interval.

As illustrated by FIG. 5B, the sequence of operations in the vertical domain are as follows:

(1) From the beginning of a present field until the appearance of the first K pulse, the line counter 92 starts counting, the DC1 value is a value held over from a prior field; and the DC 2 value is a value held over in the sample and hold circuit 105 from the same prior field.

(2) From the appearance of the pulse K until the end of the present field, the line counter 92 ceases counting and a new DC1 value is put out and held in the circuit 97, and the DC2 amplitude value is held by the sample and hold circuit 105.

In these conditions the signals DC1 and DC2 are never interrupted and are always available to control the operation of the ghost image reduction circuitry. Furthermore, it is sometimes desirable to average DC1 and DC2 over several fields in order to improve signal to noise ratios thereof.

The signal DC1 is put out over a line 96 and the signal DC2 is put out over a line 98. The lines 96 and 98 enter a ghost image eliminator circuit 100 depicted in greater structural detail in FIG. 7A. Video containing a ghost image as received on the line 32 also enters the ghost eliminator circuit 100. An output line 102 puts out video in which ghost images have been reduced in accordance with the principles of the present invention.

Referring now to FIG. 7A the ghost image eliminator circuit 100 preferably includes a summing circuit 104 which sums a derived inverse function of the ghost image with the main path image in order to subtractively cancel the ghost image from the main path video coming in on the line 32. As shown in FIG. 7B, incoming video on the line 32 includes a main path reference pulse 20 (and main path video) and a ghost pulse 20' (and ghost path video). The signal put out as waveform B of FIG. 7B on the line 102 comprises only the main path reference pulse (and main path video) in which the ghost image has been eliminated. Elimination of the ghost image is carried out by use of a feedback delay line configuration as illustrated in FIG. 7A.

Signal DC1 is a voltage level which is varied in order to adjust the frequency of a voltage controlled oscillator 106, the output of which is used to clock a CCD variable delay line 108. The delay through the CCD variable delay line 108 is thereby made equal to the measured delay of the ghost image relative to the main path image. Thus, the output signal B on the line 102 is delayed in passing through the CCD variable delay line 108 precisely by the amount of delay of the ghost image. The output from the CCD variable delay line 108, waveform C of FIG. 7B, is gain controlled by virtue of passage through a multiplier circuit 110. The gain of the multiplier circuit 110 is made equal to the attenuated ghost amplitude in comparison with the main path signal by employing the DC2 control signal as a measure of ghost amplitude and sign. An inverter 112 inverts the signal put out by the multiplier 110 to provide a cancellation signal, graphed as waveform D in FIG. 7B. This cancellation signal is then fed back to the summing junction 104 where it is additively subtracted from the main path video signal, thereby effectively reducing in precise phase the unwanted ghost image.

Only one ghost image phenomenon may be effectively removed or reduced from each field by operation of the FIG. 4 system. However, with reference to FIGS. 8 and 9, further techniques may be employed in order to remove a plurality of ghost images present in the received television picture signal.

With reference to FIG. 8A, the line 90 carrying the ghost image pulse, waveform K, enters a circuit 120 which includes a ten line delay circuit 122, a hold circuit 124 and a gate circuit 126. The gate 126 is opened by the first K pulse encountered on line 90, and delayed by a ten line delay provided by the circuit 122. This action is graphed as waveform P of FIG. 8B. The gate 126 is closed at the end of the present field. The hold circuit 124 holds the signal P until the end of each field, as graphed as waveform Q in FIG. 8B. Thus, signal K' put out on the line 128 does not have any information from the first ghost and is therefore available to control the measurement cycle for the second ghost.

Figure 9:
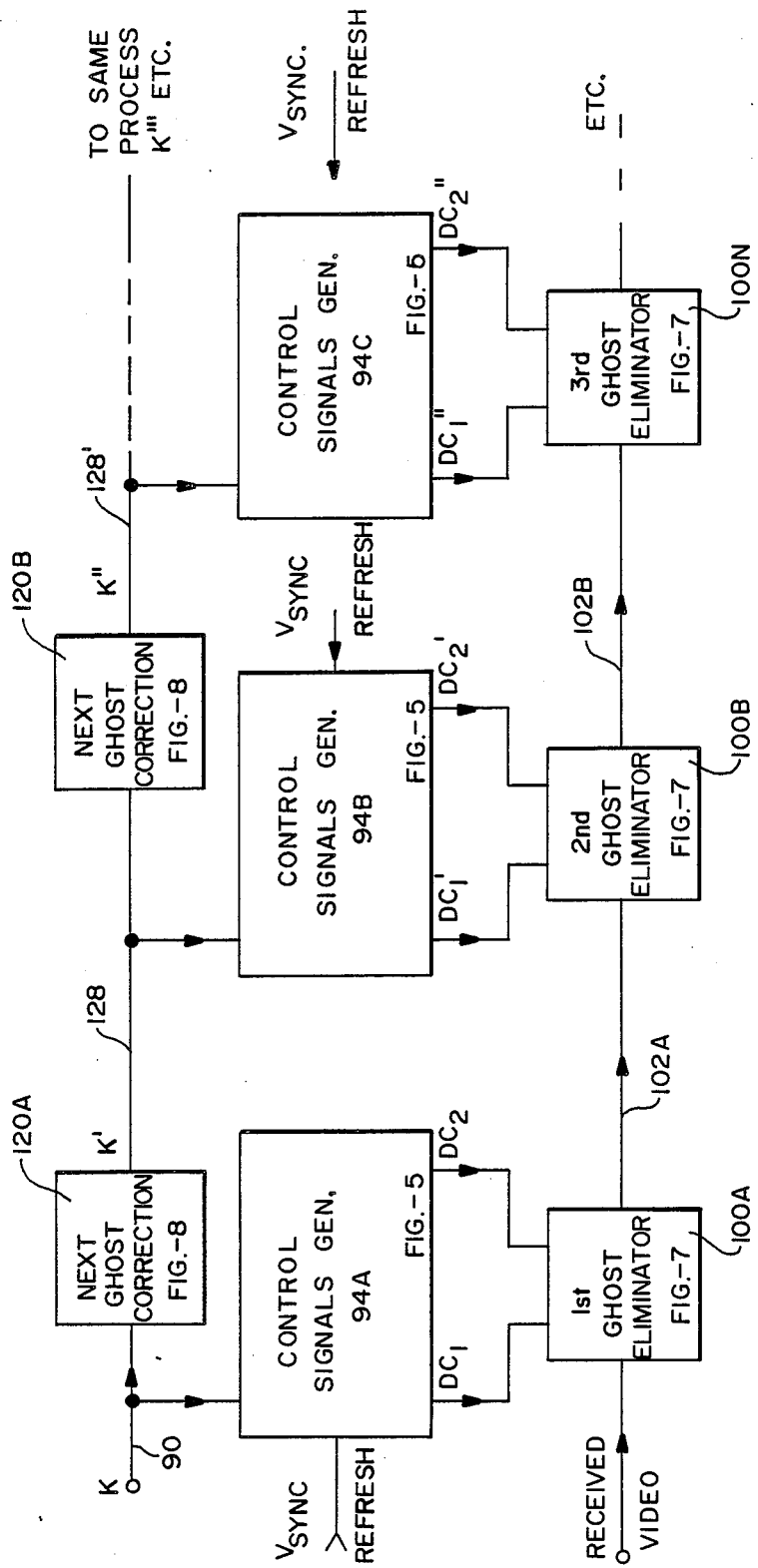
FIG. 9 is a block diagram of a multiple ghost image reduction system in accordance with the FIG. 4 embodiment and incorporating the principles of the present invention.

A tandem arrangement of ghost eliminator circuits is illustrated in FIG. 9. The FIG. 9 architecture essentially replicates the control signal generator 94 and ghost eliminator circuit 100 depicted in FIG. 4A, so that multiple ghosts may be sequentially eliminated from the video path. Three circuit configurations are shown in FIG. 9 and three separate ghost images from three multi-paths may be eliminated with this configuration.

The different pulses K, K' K", etc., are each used to generate a set of DC1 and DC2 control values typical of each particular ghost image present in the picture. Ghost reduction is then done serially by connecting the control signals generator 94 and ghost eliminator 100 elements in tandem as shown in FIG. 9. A tandem arrangement for greater than three separate ghosts may be assembled and used in accordance with the FIG. 9 architecture. Usually, two or three ghost elimination processes are sufficient to eliminate the ghosts significantly detracting from the quality of the received picture images.

Figure 10A:
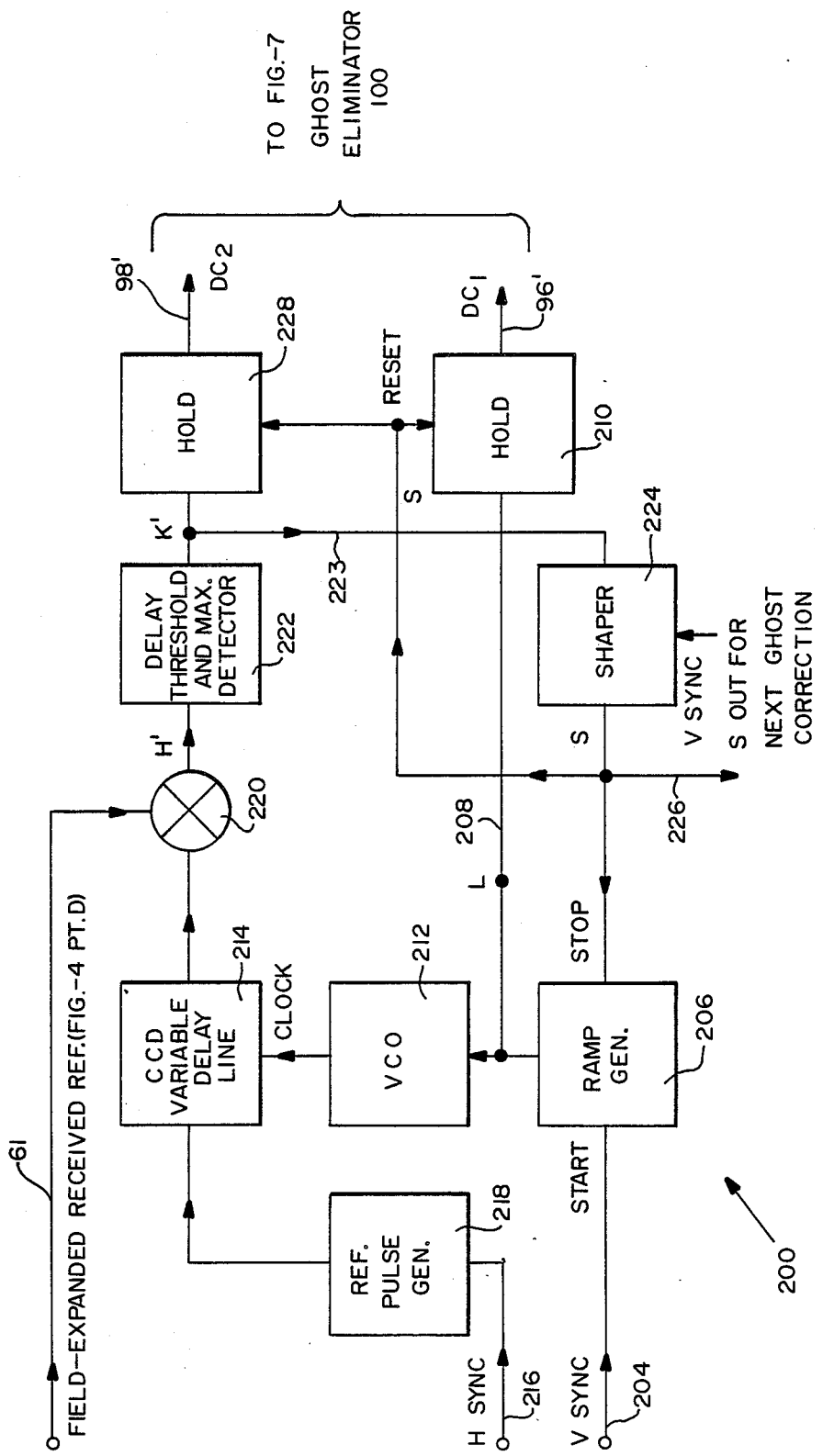
FIG. 10A is a block diagram of a ghost image corrector circuit alternative to the FIG. 4A implementation and operating in accordance with the principles of the present invention, albeit more imperfectly.

FIG. 10A sets forth an alternative preferred embodiment of a ghost corrector system 200 incorporating principles of the present invention and more readily implemented with conventional analog circuit elements. In the FIG. 10A embodiment, generation of the control signals DC1 and DC2 is performed by means of a variable delay line and a multiplier acting as a correlator in a fashion analogous to the operation of the FIG. 4A control circuit 52.

The beginning of the field, as marked for example by vertical sync on a line 204, starts a voltage ramp generator 206; and, the ramp generator 204 stops when the delayed H reference pulse and the ghost pulse coincide, as explained in greater detail shortly. The DC1 time delay control signal is obtained at an output 208 of the voltage ramp generator 206, and it is held in a hold circuit 210 until it is reset e.g. by the next ghost detection in the next field. The hold circuit 210 puts out the held DC1 signal to the FIG. 7 ghost eliminator 100 via a line 96'.

The voltage reached by the ramp generator 204 controls the clock frequency of a voltage controlled oscillator 212, and it in turn clocks (i.e. sets the variable delay period of) a CCD variable delay line 214. The delay time of the delay line 214 is controlled for each field by the clock pulse frequency put out by the VCO 214. Horizontal sync on a line 216 clocks a reference pulse generator 218 which puts out a reference pulse for passage through the variable delay line 214 at the beginning of each line.

The delayed reference pulse put out by the variable delay line is connected to a multiplier 220 which receives the robust waveform D reference pulse and ghost image pulse signal via the line 61 from a full field expansion circuit 60 of the type shown in FIG. 4A. The multiplier 220 acts as a correlator in a way which is similar to the function of the multiplier 68 described above in connection with FIG. 4A. Usually, the output of the multiplier 220 is zero. However, when there is a coincidence during the present field of the delayed reference pulse repeatedly passing through the variable delay line 214 and a ghost pulse on the line 61, there is a value H' put out by the multiplier which is directly analogous to waveform H discussed above in conjunction with FIGS. 4A and 4B.

The output pulse H' from the multiplier circuit 220 is therefore directly correlated to the time and the amplitude of the ghost image signal; and this output is connected to a delay, minimum threshold, and maximum amplitude detector circuit 222 This circuit 222 combines the functions of the threshold circuit 70 and the maximum amplitude detector circuit 78 previously described in conjunction with FIG. 4A with the addition of some delay. The minimum threshold aspect of the circuit 222 eliminates low level noise and ringing, etc.; while the maximum amplitude aspect of the circuit 222 is a correlation to ghost image amplitude. The delay aspect of the circuit 222 provides enough time for the loop comprising the circuit elements 224, 206, 212, 214, 220 and 222 to operate properly. The output from the circuit 222, which is analogous to waveform K previously discussed, is sent on a line 223 to a shaper circuit 224 which shapes the signal into a control signal S (FIG. 10B).

Figure 10B:
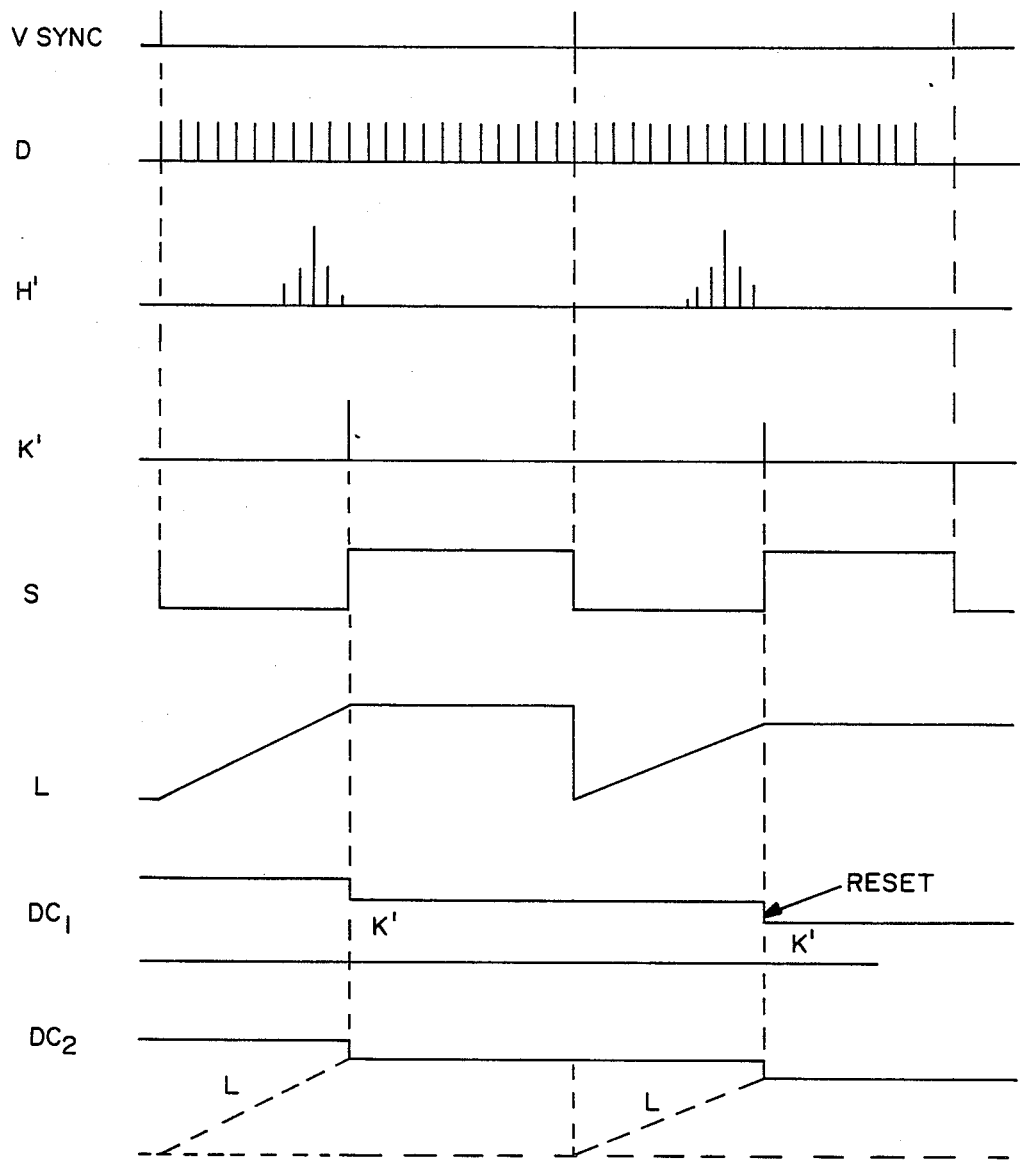
FIG. 10B sets forth a series of waveform graphs illustrating operation of the FIG. 10A ghost image corrector.

The positive going edge of control signal S (FIG. 10B) marks the coincidence in time of the delayed reference pulse put out at the output of the CCD delay line 214 and the ghost image, such coincidence being delayed by the circuit 222 as per waveforms H' and K' of FIG. 10B. It is in response to the arrival of the positive going edge of control pulse S that the ramp generator 206 is stopped.

When the ramp generator 206 stops, the delay of the delay line 214 becomes fixed for the present field. At the beginning of the next field, the vertical sync signal on the line 204 resets and restarts the ramp generator 206, and the process is repeated. From the arrival of the ghost image pulse via waveform D on line 61 until the next ghost detection in the next field, the output K' of the circuit 222 is held by a hold circuit 228 and put out via a line 98' as the DC2 amplitude control signal to e.g. the FIG. 7 ghost eliminator circuit 100.

Figure 11:
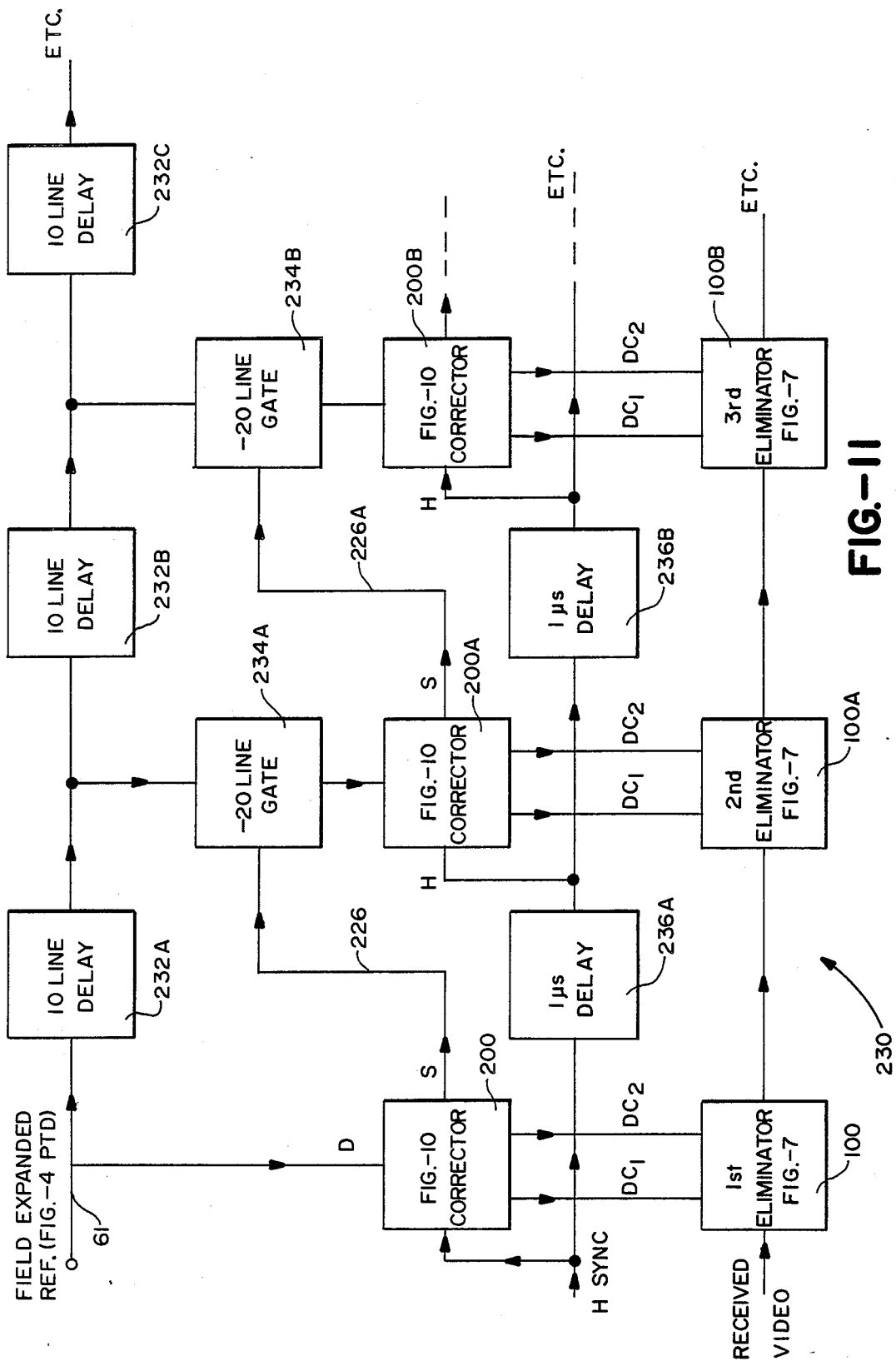
FIG. 11 is a block diagram of a multiple ghost image reduction sytem in accordance with the FIG. 10 embodiment and incorporating the principles of the present invention.

FIG. 11 shows an architecture 230 which cascades the FIG. 10 system three times in order to handle three separate ghost images within the incoming television picture. This approach uses 10 line delay circuits 232 and 20 line gate circuits 234 in order to provide suitable timing in the circuit arrangement shown in FIG. 11 so that each ghost image pulse is progressively removed from the line 61 as the subsequent ghost reduction circuit is reached. The twenty line gate 234A provides a rectangular pulse centered around the first ghost image pulse. This rectangular pulse eliminates the first ghost image pulse provided at the input of the second FIG. 10A corrector 200A, thus permitting the corrector 200A to be triggered by the second ghost pulse. The twenty line gate 234B provides a pulse centered around the second ghost image pulse, etc. A series of one microsecond delays 236 are also included in cascade as shown in FIG. 11.

Figure 12A:
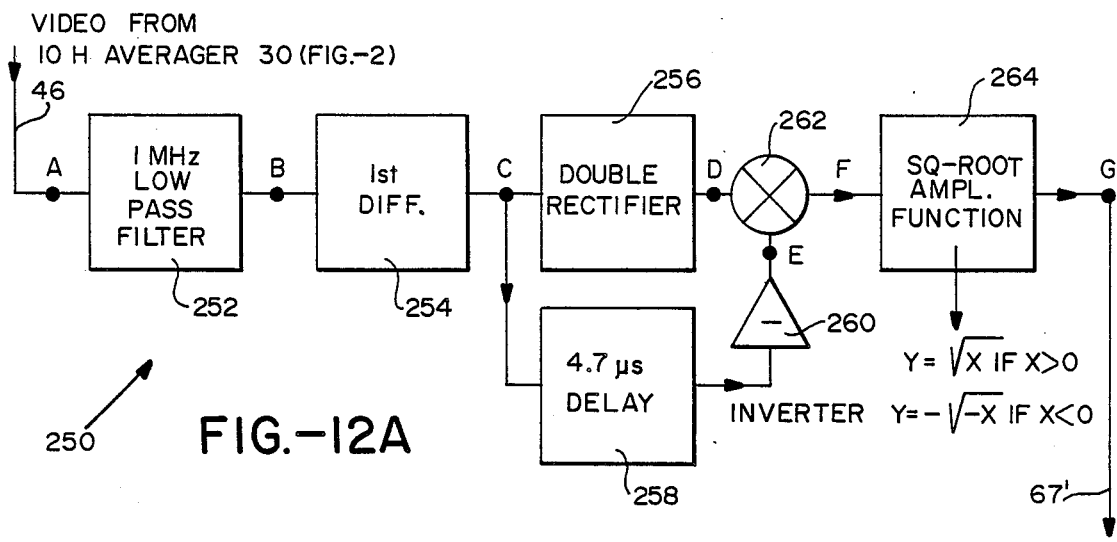
FIG. 12A is a block diagram of a ghost image reduction system utilizing the sync pulse as a reference signal in accordance with the principles of the present invention.

FIG. 12A sets forth a circuit 250 which may be substituted for the elements preceding the threshold circuit 70 in FIG. 4 in the event that the 4T sine-square pulse is not inserted at the transmission end, and is therefore not available for use at the receiving end to reduce ghost images.

The FIG. 12A circuit 250 enables the use of the horizontal sync pulses (or some other signal artifact such as vertical interval equalization or serration pulses) as the reference pulse during the vertical interval only. However, the approach taken with the circuit 250 requires that the active portion of the line following the H sync pulse be free from useful video information. This condition is traditionally true only for lines 10 through 19 and lines 272 through 281 occurring during the vertical blanking interval. Vertical interval test signals or Videotext information may not be carried in these lines if the circuit 250 is to make effective use of the horizontal sync pulses thereof.

As horizontal sync pulses have two edges separated by 4.7 microseconds, it is necessary to combine both edges into a single pulse. This task is performed by the FIG. 12A circuit 250. Video from the ten line averager circuit 30 (FIG. 2) enters the circuit 250 via the line 46. It is low pass filtered in a filter 252 which has a 1 MHz 6db cutoff point to provide a signal graphed as waveform B in FIG. 12B.

Figure 12B:
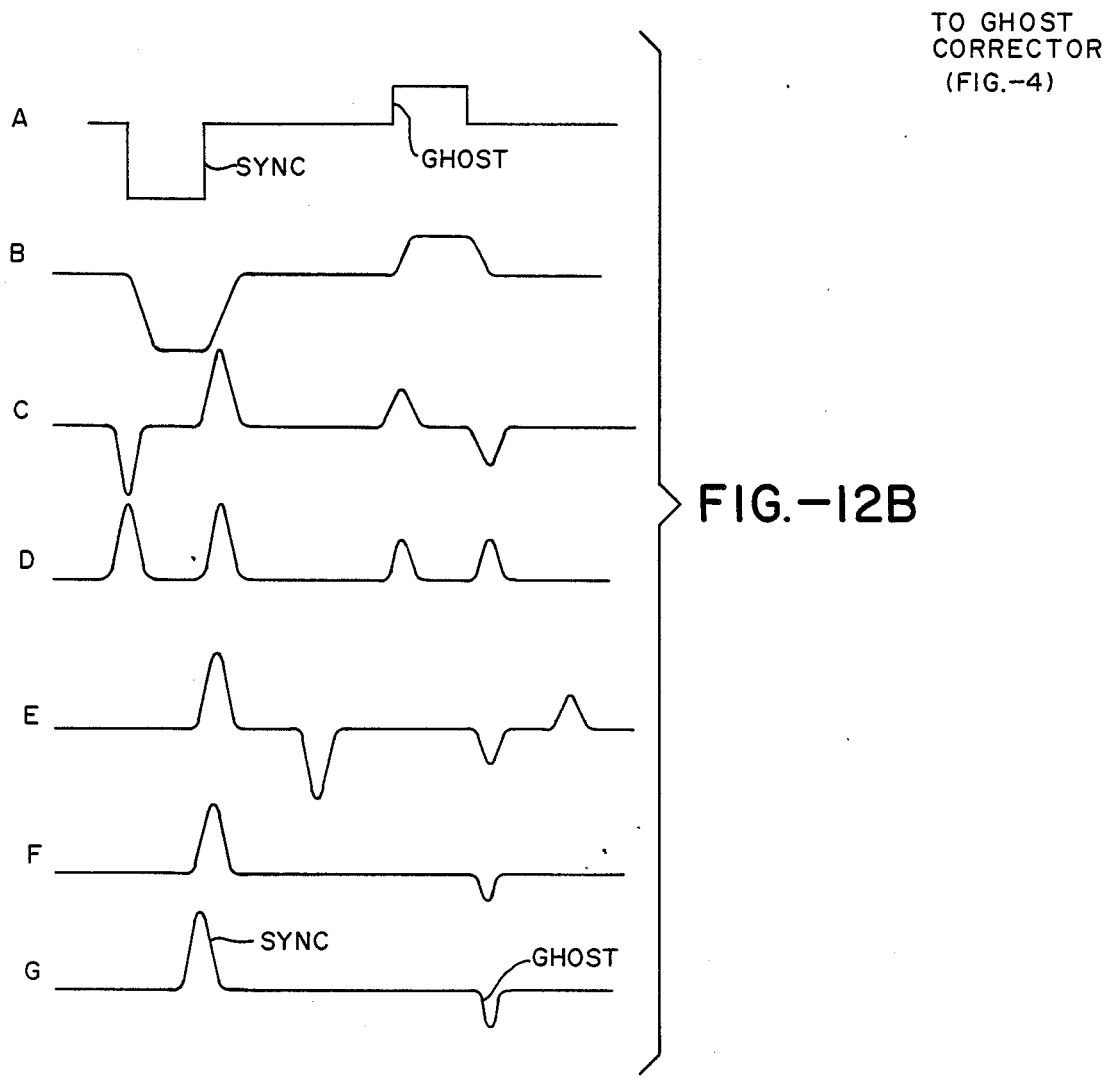
FIG. 12B sets forth a series of waveform graphs illustrating operation of the FIG. 12A system.

The low pass filtered signal is then differentiated in a first differentiator circuit 254 in order to generate a pulse corresponding to each edge of sync and its ghost, graphed as waveform C in FIG. 12B. Then, the waveform C pulse is full wave rectified by a double rectifier 256 with good dynamic range (40 db or better) to yield pulses of absolute amplitude value, waveform D of FIG. 12B.

The waveform C pulse is also passed through a 4.7 microsecond fixed delay circuit 258 and inverted by a unitary gain inverter amplifier 260 to provide waveform E, FIG. 12B. The waveform D and E signals are then multiplied in a multiplier circuit 262 to provide waveform F, FIG. 12B. The output waveform F of the multiplier 262 is proportional to the square of the ghost image amplitude; it is therefore necessary to take the square root of the waveform F signal (while preserving its polarity) as with a suitable square root derivation circuit 264.

Alternatively to the derivation circuit 264, a limiter (not shown) may be inserted in series with the double rectifier between the first differentiator 254 and the multiplier 262 in order to present at the multiplier input D a three level signal: either +1, −1 or zero, which does not contain ghost amplitude information.

The output G on the line 67' of the circuit 250 of FIG. 12A may be used in lieu of the 4T sine-squared pulse reference signal in conjunction with the systems described herein with reference to FIGS. 4 through 11. Also, the configurations described in conjunction with FIGS. 4 through 11 may be utilized with the circuit 250 only so long as single pulses may be extracted from the sync and its ghost images which amount to reasonable facsimiles of the 4T sine-square pulse and its ghost images.

There are cases when a reference pulse in the vertical interval is not provided, and when lines 10 through 19 and lines 272 through 281 are not free of video information in the video region, thus making it impossible the use of reference or sync pulses of those lines for effective ghost detection and reduction. In such cases, the use of vertical interval serration and/or equalization pulses as embodiment depicted in FIG. 13A will provide a good method for ghost detection and reduction. FIG. 13B graphs the operation of the FIG. 13A ghost reduction system.

Figure 13A:
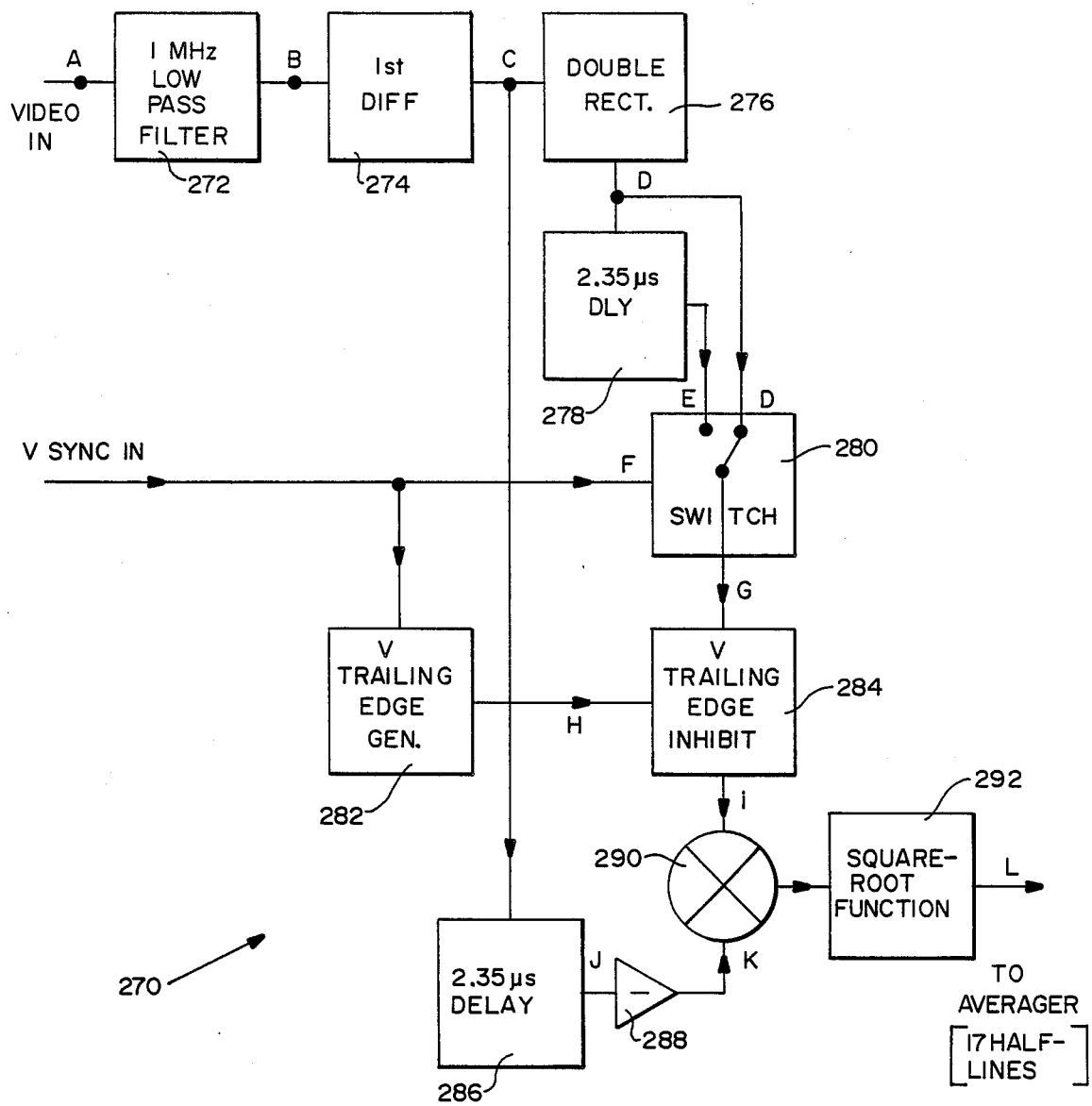
FIG. 13A is a block diagram of a ghost reduction system utilizing vertical equalization and serration pulses as reference signals in accordance with the principles of the present invention.
Figure 13B:
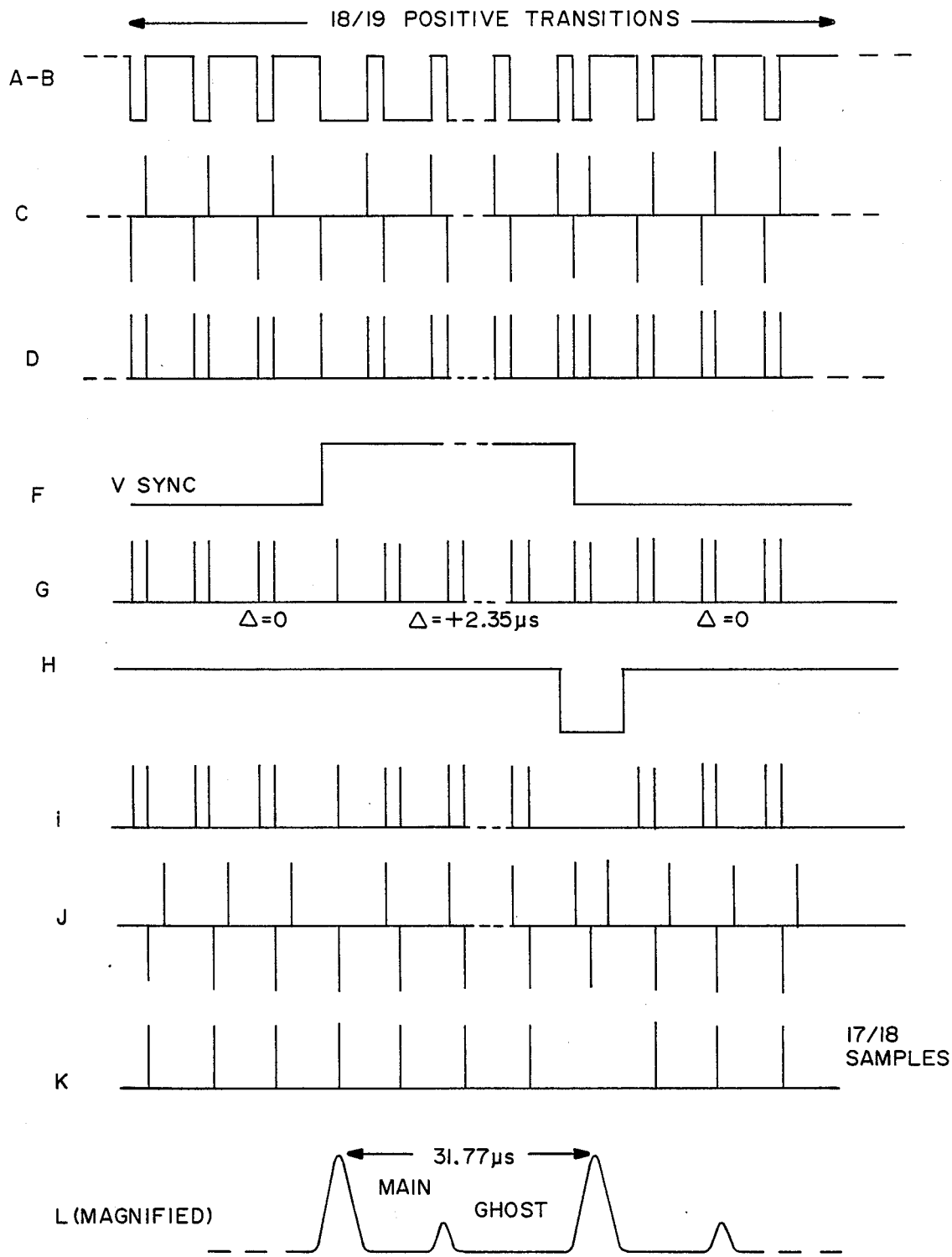
FIG. 13B sets forth a series of waveform graphs illustrating operation of the FIG. 13 system.

In FIG. 13A, incoming video (graph A of FIG. 13B) is passed through a one MHz low pass filter 272 (graph B of FIG. 13B) and a first differentiator 274 (graph C of FIG. 13B). The resultant derivative is double rectified in a double rectifier graph D of FIG. 13B) and then delayed in a 2.35 microsecond delay element 278 (graph E of FIG. 13B). The signals D and E are then alternatively selected by a switch 280 triggered by vertical sync. The selected resultant signal (graph G of FIG. 13B) is then passed through a vertical trailing edge inhibit circuit 284 to a multiplier 290. The inhibit circuit 284 is controlled by a vertical trailing edge generator circuit 282 in response to the vertical sync pulse.

The multiplier 290 multiplies the derivative C from the first differentiator circuit 274 by the signal I from the inhibit circuit 284 as passed through a 2.35 microsecond delay circuit 286 and an inverter 288. The resultant product is passed through a square root function circuit 292 to provide signal L of FIG. 13B, and this signal then is sent to an averager circuit similar to the one depicted and discussed in connection with the FIG. 2 circuit above.

The operation of the FIG. 13A system 270 is similar in principle to the operation of the FIG. 12A circuit, with the following differences:

(1) As the width of equalization and serration pulses is 2.35 microseconds (instead of 4.75 microseconds for H sync pulses), delays 286 and 278 of the FIG. 13A system 270 have to be 2.35 microseconds.

(2) As the polarity of equalization and serration pulses (graphs A and B of FIG. 13B) are inverted, and as the negative going edge remains in all cases a timing reference (each negative edge following the prior one by 31.77 microseconds, waveform C of FIG. 13B), it is necessary to delay signal D of FIG. 13B by 2.35 microseconds during V sync (graph F of FIG. 13B) only, by the circuit 278 and the switch 280 in the FIG. 13A system 270.

(3) The vertical sync trailing edge is of a complicated structure and pulses located in its vicinity are not to be used for ghost detection and reduction: this vicinity is effectively inhibited by action of the vertical trailing edge generator 282 and the vertical trailing edge inhibit circuit 284 in the system 270, as per waveforms H, I, J, and K of FIG. 13B.

(4) As mentioned, the FIG. 2 averager is modified for use with the system 270. Delay 48 becomes a half-line period (31.77 microseconds). Gate 40 is then closed, not for ten lines, but for 17 half line periods.

To those skilled in the art to which this invention relates, many changes in construction and widely varying embodiments will suggest themselves without departing from the spirit and scope of the invention. The disclosures and the description herein are purely illustrative and are not intended to be in any sense limiting.

I claim:

1. A method for controlling reduction of a ghost image present in a main path baseband television video signal defining a vertical blanking interval and a useful picture area and comprising the steps of:
   driving a main path reference pulse and ghost image of the pulse from the vertical blanking interval of a present field of the video signal, the derived ghost image having an amplitude less than the amplitude of the derived main path reference pulse,
   replicating the derived reference pulse and derived ghost image at a predetermined repetition rate substantially throughout the useful picture area of the interval of the present field to provide a replicated ghost image,
   generating a ghost image correlation signal used for correlation of the ghost image with the derived main path reference pulse which is delayed in time from the occurrence of the beginning of the present video field,
   correlating the replicated ghost image with the ghost image correlation signal to ascertain a location of coincidence in order to provide a correction pulse indicating the delay period and amplitude of the ghost image of the pulse,
   generating at least two control signals respectively related to delay period and amplitude of the ghost image as provided by the correction pulse,
   operating a ghost reduction circuit for the present field in response to the said at least two control signals
   updating the said at least two control signals at a rate no more frequently than a field by field basis, and
   passing the main path baseband television video signal through the ghost reduction circuit wherein a function related to determined amplitude and delay period of the ghost image with the main path baseband television video signal is combined in order to reduce the amplitude of the ghost image present in the video signal.

2. The control method set forth in claim 1 wherein the step of generating the ghost image correlation signal used for correlation comprises the steps of:
   repeatedly generating a pulse at the horizontal line rate of the present field of the video signal,
   successively delaying and putting out for correlation each succeeding pulse by a predetermined time delay so that the spatial location of the pulse relative to scan line position may progress from one end of the video portion of the scan line to the other end of the video portion thereof during the present field interval.

3. The control method set forth in claim 1 wherein the step of generating the ghost image correlation signal used for correlation comprises the steps of:
   starting a voltage ramp generator at the beginning of the present field interval to generate a progressively increasing voltage ramp,
   applying the voltage ramp to control frequency of control pulses generated by a voltage controlled oscillator,
   applying the control pulses generated by the voltage controlled oscillator to clock a variable delay thereby progressively to extend the delay period thereof,
   repeatedly generating a reference pulse at the horizontal line rate of the present field of the video signal,
   repeatedly passing the reference pulse through the variable delay to provide a progressively delayed reference pulse so that the spatial location of the pulse relative to scan line position may progress from one end of the video portion of the scan line to the other end of the video portion therof during the present field interval, and
   stopping the ramp generator at a particular voltage upon ascertainment of the location of coincidence.

4. The control method set forth in claim 1 wherein the step of correlating the replicated ghost image with the correlation signal comprises the steps of:
   multiplying the replicated ghost image times the ghost image correlation signal in a multiplier to ascertain a product indicative of the delay period of the ghost image of the pulse,
   passing the product through a minimum threshold circuit to eliminate low level signals below the threshold including noise, and
   passing the threshold passed product through a maximum amplitude detector circuit for detecting the instance of maximum amplitude of the product to provide the correction pulse.

5. The control method set forth in claim 1 wherein the step of generating the two control signals comprises the steps of:
   holding the amplitude of the correction pulse until the next successive correction pulse is available in order to provide one of said control signals related to ghost amplitude,
   generating a progressively increasing voltage starting at the beginning of the present field of the video signal and stopping at the arrival of the correction pulse to provide the other control signal related to ghost time delay, and holding the voltage reached during the holding interval until the next successive said other control signal is counted.

6. The control method set forth in claim 3 wherein the step of generating the two control signals comprises the steps of:
   holding the amplitude of the correction pulse until the next successive correction pulse is available in order to provide the one control signal related to ghost amplitude,
   holding the particular voltage reached by the ramp generator in order to provide the other control signal related to ghost time delay, until the next successive particular voltage is available at the ramp generator.

7. The control method set forth in claim 1 comprising the step of providing a low frequency pulse as the reference pulse at a predetermined location in predetermined sequential horizontal lines of the vertical interval wherein the frequency of the low frequency reference pulse is not greater than one half the bandwidth of the baseband video signal spectrum.

8. The control method set forth in claim 7 wherein the low frequency reference pulse is a 4T sine squared pulse.

9. The control method set forth in claim 1 comprising the step of using as the main path reference pulse at least one type of the synchronizing pulses present in the vertical blanking interval selected from the group comprising horizontal sync pulse, equalization pulse, serration pulse.

10. The control method set forth in claim 1 wherein the step of deriving a main path reference pulse and ghost image of the pulse is carried out during a successive series of pulses and ghost images of the pulses present during the vertical blanking interval and includes the step of averaging the reference pulse and ghost imabe thereof over a plurality of n time intervals in order to improve the signal to noise ratio thereof.

11. The control method set forth in claim 10 wherein the n time intervals are scanning n line intervals.

12. The control method set forth in claim 10 wherein said averaging step comprises the step of recirculating a delayed fractional component of each successive line.

13. The control method set forth in claim 12 wherein the step of recirculating a delayed fractional component of each successive line comprises the steps of:
  applying the baseband signal containing the reference pulse to an input port of an adder circuit,
  delaying the output of the adder circuit by passing it through a delay period equal to the period of one horizontal scanning line to create a delayed adder output signal,
  adding a function of the delayed adder output signal to the undelayed baseband signal at the adder circuit, the function being zero outside of an averaging interval corresponding to the duration of the n scanning lines containing the reference pulse, and slightly less than unity within said averaging interval.

14. The control method set forth in claim 1 wherein the steps of operating the ghost reduction circuit for the present field in response to the at least two said control signals and passing the main path baseband television video signal through the ghost reduction circuit during the present field comprise the steps of:
  summing the baseband television picture signal and a function of the baseband picture signal in order to reduce the ghost image by cancellation,
  delaying a component of the summed baseband television signal by a delay period related to the one of the at least two control signals corresponding to the delay of the ghost image,
  multiplying the delayed component of the baseband television signal by an amplitude value of the one of the at least two control signals corresponding to the amplitude of the ghost image to provide a product,
  inverting the product to provide the function added to the baseband video signal at the summing step.

15. The control method set forth in claim 14 wherein the main path baseband television video signal is characterized by the presence of multiple ghost images and comprising the process of separately carrying out the steps hereof in a series sequence for a plurality of ghost images within the main path baseband television video signal.

16. The control method set forth in claim 15 comprising the further step of providing a processing window around each separate ghost image of the main path baseband television video signal.

17. The control method set forth in claim 9 wherein the main path reference pulse is a horizontal sync pulse.

18. The control method set forth in claim 9 wherein the main path reference pulse is at least one of the group comprising equalization pulses and serration pulses.

19. The control method set forth in claim 1 wherein the step of replicating the derived reference pulse and derived ghost image is carried out on a scan line by scan line basis.

20. The control method set forth in claim 1 comprising the further step of averaging the said at least two control signals over a plurality of successive fields so as to improve the signal to noise ratios thereof.

* * * * *